(12) United States Patent
Girmonsky et al.

(10) Patent No.: US 12,480,898 B2
(45) Date of Patent: *Nov. 25, 2025

(54) Z-PROFILING OF WAFERS BASED ON X-RAY MEASUREMENTS

(71) Applicant: APPLIED MATERIALS ISRAEL LTD., Rehovot (IL)

(72) Inventors: Doron Girmonsky, Raanana (IL); Michal Eilon, Beit-Elazari (IL); Dror Shemesh, Hod Hasharon (IL); Uri Hadar, Tel-Aviv (IL)

(73) Assignee: Applied Materials Israel Ltd., Rehovot (IL)

( * ) Notice: Subject to any disclaimer, the term of this patent is extended or adjusted under 35 U.S.C. 154(b) by 390 days.

This patent is subject to a terminal disclaimer.

(21) Appl. No.: 17/901,705

(22) Filed: Sep. 1, 2022

(65) Prior Publication Data

US 2024/0085356 A1    Mar. 14, 2024

(51) Int. Cl.
*G01N 23/2252* (2018.01)
*G06N 3/08* (2023.01)

(52) U.S. Cl.
CPC .......... *G01N 23/2252* (2013.01); *G06N 3/08* (2013.01)

(58) Field of Classification Search
CPC .......... G01N 23/2252; G01N 23/2251; G01N 23/2255; G01N 23/2257; G01N 23/2258; G01N 23/225

See application file for complete search history.

(56) References Cited

U.S. PATENT DOCUMENTS

| | | | |
|---|---|---|---|
| 4,634,868 | A | 1/1987 | Delacy |
| 5,412,210 | A | 5/1995 | Todokoro et al. |
| 6,670,610 | B2 | 12/2003 | Shemesh et al. |
| 8,232,523 | B2 | 7/2012 | Boughorbel et al. |
| 8,581,189 | B2 | 11/2013 | Boughorbel et al. |

(Continued)

FOREIGN PATENT DOCUMENTS

| | | |
|---|---|---|
| EP | 2557587 B1 | 10/2015 |
| EP | 3297018 B1 | 3/2019 |

OTHER PUBLICATIONS

U.S. Appl. No. 17/947,481, "Non-Final Office Action", Jan. 29, 2025, 30 pages.

(Continued)

*Primary Examiner* — Michael J Dalbo
(74) *Attorney, Agent, or Firm* — Kilpatrick Townsend & Stockton LLP

(57) ABSTRACT

A computer-based method for non-destructive z-profiling of samples. The method includes: a measurement operation and a data analysis operation. The measurement operation includes, for each of a plurality of landing energies: (i) projecting an electron beam on a sample at a respective landing energy, such that light-emitting interactions between electrons from the electron beam and the sample occur within a respective probed region of the sample, which is centered about a respective depth; and (ii) measuring the emitted light to obtain an optical emission data set of the sample. The data analysis operation includes obtaining from the measured optical emission data sets a concentration map quantifying a dependence of a concentration of a material, which the sample comprises, on at least the depth.

20 Claims, 9 Drawing Sheets

(56) References Cited

U.S. PATENT DOCUMENTS

| | | | |
|---|---|---|---|
| 8,709,269 B2 | 4/2014 | Shemesh | |
| 9,625,398 B1* | 4/2017 | Campbell | G01N 23/2252 |
| 10,354,418 B2 | 7/2019 | Recur et al. | |
| 10,928,336 B1 | 2/2021 | Shemesh | |
| 11,264,202 B2 | 3/2022 | Chirko et al. | |
| 11,321,835 B2 | 5/2022 | Levant et al. | |
| 11,404,244 B1 | 8/2022 | Zur | |
| 11,543,368 B2 | 1/2023 | Shemesh | |
| 2010/0196296 A1* | 8/2010 | Geissler | C09D 7/62 424/61 |
| 2012/0180859 A1* | 7/2012 | Lee | H10F 77/211 252/514 |
| 2013/0228683 A1 | 9/2013 | Boughorbel et al. | |
| 2016/0322195 A1* | 11/2016 | Sender | H01J 37/265 |
| 2020/0194224 A1 | 6/2020 | Stoschus et al. | |
| 2020/0411513 A1* | 12/2020 | Jambunathan | H10D 30/0245 |
| 2021/0356413 A1* | 11/2021 | Sakamae | G01N 23/20091 |
| 2023/0003675 A1* | 1/2023 | Kaplenko | G01N 23/083 |
| 2023/0279281 A1* | 9/2023 | Yamashita | H01F 6/00 252/71 |
| 2024/0054669 A1 | 2/2024 | Houben et al. | |

OTHER PUBLICATIONS

Comon, et al., "Handbook of Blind Source Separation", Independent Component Analysis and Applications, Feb. 17, 2010, 65 pages.

Gajowniczek, et al., "Blind Source Separation for the Aggregation of Machine Learning Algorithms: An Arrhythmia Classification Case", Electronics, vol. 9, No. 3 Available online at: https://www.mdpi.com/2079-9292/9/3/425, Mar. 3, 2020, 14 pages.

Hyvarinen, et al., "Independent Component Analysis: Algorithms and Applications", Neural Networks, vol. 13, No. 4-5, Jun. 2000, 31 pages.

* cited by examiner

Z-PROFILING OF WAFERS BASED ON X-RAY MEASUREMENTS

TECHNICAL FIELD

The present disclosure relates generally to z-profiling of semiconductors based on X-ray measurements

BACKGROUND OF THE INVENTION

Currently, more than forty different materials are employed in the semiconductor industry. Accordingly, material characterization—specifically, in the logic and memory segments, material z-profiling—plays an ever more crucial role. For example, concentration mapping of nitrogen and fluorine in a gate stack is critical for ensuring device performance and reliability. State-of-the-art techniques for material z-profiling include time-of-flight secondary ion mass spectrometry (ToF-SIMS) and transmission electron microscopy energy dispersive X-ray (TEM-EDX) spectroscopy. However, both techniques are destructive. There is a need in the art for non-destructive material z-profiling techniques.

BRIEF SUMMARY OF THE INVENTION

Aspects of the disclosure, according to some embodiments thereof, relate to z-profiling based on X-ray measurements. More specifically, but not exclusively, aspects of the disclosure, according to some embodiments thereof, relate to z-profiling of materials, such as fluorine and/or nitrogen, introduced into semiconductor structures to tweak one or more physical properties thereof.

Thus, according to an aspect of some embodiments, there is provided a computer-based method for non-destructive z-profiling of samples. The method includes:

A measurement operation including—for each of a plurality of landing energies, which is selected so as to allow probing the sample to a plurality of depths—suboperations of:
  Projecting an electron beam (e-beam) on a sample. The e-beam penetrates the sample and induces light-emitting interactions within a respective probed region of the sample, whose depth is determined by the landing energy.
  Measuring the emitted light to obtain an optical emission data set pertaining to the probed region.
A data analysis operation wherein, based at least on the obtained optical emission data sets, a concentration map is generated. The concentration map quantifies a dependence of a concentration of a profiled material, which the sample includes, on at least the depth.

According to some embodiments of the z-profiling method, in the data analysis operation, the concentration map is generated taking into account an intended design of the sample.

According to some embodiments of the z-profiling method, the sample includes a bulk into which the profiled material has been introduced. The intended design of the sample specifies an intended design of the bulk. According to some such embodiments, the intended design of the sample further specifies a nominal distribution of the profiled material.

According to some embodiments of the z-profiling method, the bulk is or includes a semiconductor structure.

According to some embodiments of the z-profiling method, the profiled material includes fluorine, nitrogen, boron, and/or gallium.

According to some embodiments of the z-profiling method, the landing energies are selected so as to induce emission of X-rays from each of the probed regions. The X-rays constitute at least part of the emitted light. According to some such embodiments, the landing energies are selected so as to induce emission of characteristic X-rays from each of the probed regions.

According to some embodiments of the z-profiling method, for each landing energy the characteristic X-ray (X-ray light) emitting interactions are substantially limited to the respective probed region.

According to some embodiments of the z-profiling method, each of the suboperations of measuring the emitted light includes measuring characteristic X-rays corresponding to the profiled material.

According to some embodiments of the z-profiling method, each of the suboperations of measuring the emitted light includes measuring an intensity of a portion of the respectively emitted light. The measured portion has a frequency equal to, or within a frequency range about, a peak characteristic X-ray emission frequency of the profiled material. According to some such embodiments, the peak is the tallest peak.

According to some embodiments of the z-profiling method, the measurement operation is performed with respect to each of a plurality of lateral (i.e. horizontal) locations on the sample at which the respective plurality of e-beams is projected. The concentration map is three-dimensional.

According to some embodiments of the z-profiling method, the measuring of the emitted light, includes, for each of a plurality of return angles (collection angles), measuring a respective number of photons returned at the return angle.

According to some embodiments of the z-profiling method, each of the suboperations of measuring the emitted light includes using an image sensor obtain a two-dimensional image of the respectively emitted light. Each of the obtained two-dimensional images constitutes or is included in the respective optical emission data set.

According to some embodiments of the z-profiling method, the sample includes a plurality of layers each including one or more respective semiconductor materials.

According to some embodiments of the z-profiling method, the depth of the probed region increases with the landing energy.

According to some embodiments of the z-profiling method, the concentration is a mass density or a particle density.

According to some embodiments of the z-profiling method, within each of the probed regions a respective relative concentration of the profiled material is at most about 5%.

According to some embodiments of the z-profiling method, the concentration map is obtained as an output of a machine learning (ML) derived algorithm. The inputs of the ML derived algorithm include the measured optical emission data sets. Each of the measured optical emission data sets is labelled by the landing energy of the respectively inducing e-beam.

According to some embodiments of the z-profiling method, wherein the measurement operation is performed with respect to each of a plurality of lateral locations on the sample at which the respective plurality of e-beam is projected, each of the obtained optical emission data sets, input into the ML derived algorithm, are further labelled by the lateral coordinates of the respective lateral location at which the respective e-beam impinged the sample.

According to some embodiments of the z-profiling method, the ML derived algorithm is neural network (NN).

According to some embodiments of the z-profiling method, the NN is a regression NN.

each map coordinate(s) the concentration map specifies the density of the profiled material to within a respective density range from a plurality of density ranges.

According to some embodiments of the z-profiling method, the ML derived algorithm includes a variational autoencoder (VAE) and a classifier.

According to some embodiments of the z-profiling method, the NN is a deep NN or a generative adversarial network (GAN).

According to some embodiments of the z-profiling method, the deep NN is a convolutional NN or a fully connected NN.

According to some embodiments of the z-profiling method, the sample is a semiconductor specimen.

According to some embodiments of the z-profiling method, the sample is a patterned wafer.

According to an aspect of some embodiments, there is provided a method for training a NN for use in non-destructive z-profiling of samples. The training method includes operations of:

Generating training data for a NN. The NN is configured to (i) receive as inputs, optical emission data sets of a sample, each pertaining to a respective landing energy, from a plurality of landing energies, of a respectively inducing e-beam, and (ii) output a concentration map of a profiled material included in the sample. The training data is generated by suboperations of:

Generating calibration data by, for each of a plurality of samples:

Obtaining measured optical emission data sets of the sample by projecting thereon (e.g. one at a time) e-beams at each of a first plurality of landing energies and measuring light returned from the sample.

Obtaining a measured concentration map of the profiled material included in the sample.

Generating simulated training data for the NN by:

Using the calibration data to calibrate a computer simulation. The computer simulation is configured to (a) receive as inputs a concentration map of a sample, and a value of a landing energy of an e-beam projected on the sample, and (b) output a corresponding simulated optical emission data set.

Using the calibrated computer simulation to generate additional simulated optical emission data sets corresponding to additional landing energies and/or additional samples.

Training the NN using at least the additional simulated optical emission data sets, each labelled by the respective landing energy, and concentration maps, corresponding to the simulated optical emission data sets, respectively.

According to some embodiments of the training method, the computer simulation is calibrated such that for each pair of measured concentration map, obtained in the suboperation of generating the calibration, and landing energy, which (i.e. the pair) is input into the computer simulation, the simulated optical emission data set, output by the computer simulation, agrees to within a required precision with the respective measured optical emission data set.

According to some embodiments of the training method, prior to the calibration thereof, the computer simulation specifies initial point spread functions (PSFs) at least for each of the first plurality of landing energies. In the suboperation of calibrating the computer simulation, the initial PSFs are calibrated, thereby obtaining calibrated PSFs.

According to some embodiments of the training method, a modified Richardson-Lucy algorithm is applied to obtain the calibrated PSFs from the initial PSFs.

According to some embodiments of the training method, an adjustable U-Net deep learning NN is applied to obtain the calibrated PSFs from the initial PSFs, and optimized over adjustable parameters thereof.

According to some embodiments of the training method, the additional samples are of different intended designs than the plurality of samples.

According to some embodiments of the training method, the training method further includes reapplying the operation of generating simulated training data and the operation of training the NN when additional calibration data are available.

According to some embodiments of the training method, the NN is a regression NN.

According to some embodiments of the training method, the NN is a classification NN and at each map coordinate(s) the concentration map, output by the NN, specifies the density of the profiled material to within a respective density range from a plurality of density ranges.

According to some embodiments of the training method, the NN is a deep NN or a GAN.

According to some embodiments of the training method, the deep NN is a convolutional NN or a fully connected NN.

According to some embodiments of the training method, a ratio of a number of the additional simulated optical emission data sets to a number of the measured optical emission data sets is between about 100 and about 1,000.

According to some embodiments of the training method, the measured concentration maps are obtained by profiling lamellas extracted from each of the plurality samples and/or slices shaved thereof. According to some such embodiments, the profiling is performed using transmission electron microscopy and/or scanning electron microscopy.

According to some embodiments of the training method, the samples are semiconductor specimens.

According to some embodiments of the training method, the samples are patterned wafers.

According to some embodiments of the training method, the suboperation of obtaining measured optical emission data sets of the sample includes measuring the light returned from the sample at each of two or more return angles (i.e. collection angles), respectively.

According to an aspect of some embodiments, there is provided a system for non-destructive z-profiling of samples. The system includes an e-beam source, a light sensing module, and a computational module. The e-beam source is configured to project e-beams on a sample at each of a plurality of landing energies: Each e-beam (penetrates into the sample and) induces light emitting interactions within a respective probed region of the sample, whose depth is determined by the landing energy. The plurality of landing energies is selected so as to allow probing the sample to a plurality of depths. The light sensing module is configured to measure the emitted light to obtain optical emission data sets pertaining to the probed regions, respectively. The computational module is configured to generate, based on the measured optical emission data sets, a concentration map. The concentration map quantifies a dependence of a concentration of a profiled material, which is included in the sample, on at least the depth.

According to some embodiments of the system, the computational module is configured to take into account an intended design of the sample in generating the concentration map.

According to some embodiments of the system, the sample includes a bulk into which the profiled material has been introduced. The intended design of the sample specifies an intended design of the bulk. According to some such embodiments, the intended design of the sample further specifies a nominal distribution of the profiled material.

According to some embodiments of the system, the bulk is or includes a semiconductor structure.

According to some embodiments of the system, the profiled material includes fluorine, nitrogen, boron, and/or gallium.

According to some embodiments of the system, the landing energies are such that emission of X-rays from the probed regions is induced. The X-rays constitute at least part of the emitted light. According to some such embodiments, the landing energies are such that emission of characteristic X-rays from each of the probed regions is induced.

According to some embodiments of the system, for each landing energy the characteristic X-ray emitting interactions are substantially limited to the respective probed region.

According to some embodiments of the system, the light sensing module is configured to sense characteristic X-rays corresponding to the profiled material.

According to some embodiments of the system, the light sensing module is configured to measure an intensity of a portion the respectively emitted light, which has a frequency equal to, or within a frequency range about, a peak characteristic X-ray emission frequency of the profiled material. According to some such embodiments, the peak is the tallest peak.

According to some embodiments of the system, the light sensing module includes an energy-dispersive X-ray spectrometer or a wavelength-dispersive X-ray spectrometer.

According to some embodiments of the system, the system is further configured to allow projecting the e-beams so as to impinge on the sample at each of controllably selectable lateral locations thereon. The concentration map is three dimensional.

According to some embodiments of the system, the light sensing module may be configured to measure the number photons returned at each of two or more returned angles, respectively. According to some such embodiments, the light sensing module may include two or more light sensors (e.g. one or more energy-dispersive X-ray spectrometers and/or one or more wavelength-dispersive X-ray spectrometers).

According to some embodiments of the system, the light sensing module includes an image sensor configured to obtain two-dimensional images of the emitted light. The two-dimensional images constitute at least part of the optical emission data sets.

According to some embodiments of the system, for each landing energy, the respective light emitting interactions between electrons from the e-beam and the sample are substantially limited to the probed region.

According to some embodiments of the system, the depth of the probed region increases with the landing energy.

According to some embodiments of the system, the concentration is a mass density or a particle density.

According to some embodiments of the system, within each of the probed regions a respective relative concentration of the profiled material is at most about 5%.

According to some embodiments of the system, the computational module is configured to execute a ML derived algorithm, whose output is the concentration map and whose inputs include the optical emission data sets, each labelled by the respective landing energy.

According to some embodiments of the system, the system is further configured to allow projecting the e-beams so as to impinge on the sample at each of controllably selectable lateral locations thereon. The concentration map is three-dimensional. Each of the obtained optical emission data sets, input into the ML derived algorithm, are further labelled by lateral coordinates of the lateral location at which the respective e-beam impinged the sample.

According to some embodiments of the system, the ML derived algorithm is a NN.

According to some embodiments of the system, the NN is a regression NN.

According to some embodiments of the system, the NN is a classification NN and at each map coordinate(s) the concentration map specifies the density of the profiled material to within a respective density range from a plurality of density ranges.

According to some embodiments of the system, the ML derived algorithm includes a VAE and a classifier.

According to some embodiments of the system, the NN is a deep NN or a GAN.

According to some embodiments of the system, the deep NN is a convolutional NN or a fully connected NN.

According to some embodiments of the system, the sample is semiconductor specimen.

According to some embodiments of the system, the sample is a patterned wafer.

According to an aspect of some embodiments, there is provided a non-transitory computer-readable storage medium storing instructions that cause a system for non-destructive z-profiling of samples (such as the above-described system) to implement the above-described z-profiling method.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures.

DETAILED DESCRIPTION OF THE INVENTION

Figure 1:
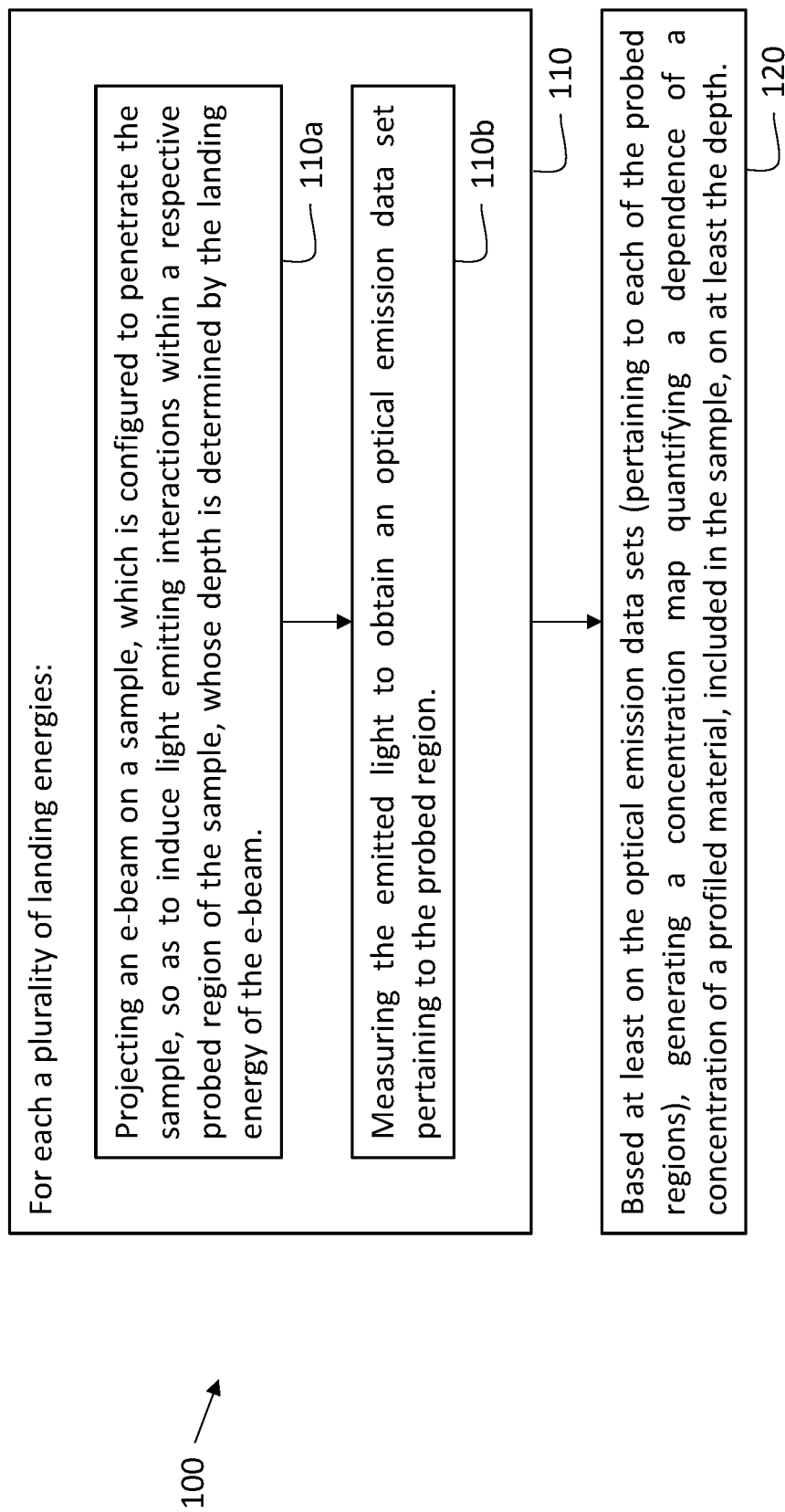
FIG. 1 presents a flowchart of a method for z-profiling of samples, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, an estimated quantity or estimated parameter may be said to be "about optimized" or "about optimal" when falling within 5%, 10%, or even 20% of the optimal value thereof. Each possibility corresponds to separate embodiments. In particular, the expressions "about optimized" and "about optimal" also cover the case wherein the estimated quantity or estimated parameter is equal to the optimal value of the quantity or the parameter. The optimal value may in principle be obtainable using mathematical optimization software. Thus, for example, an estimated (e.g. an estimated residual) may be said to be "about minimized" or "about minimal/minimum", when the value thereof is no greater than 101%, 105%, 110%, or 120% (or some other pre-defined threshold percentage) of the optimal value of the quantity. Each possibility corresponds to separate embodiments.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

In block diagrams dotted lines connecting elements may be used to represent functional association or at least one-way or two-way communicational association between the connected elements.

As used herein, according to some embodiments, the term "set" may refer to a plurality of elements as a well as to a single element. According to some embodiments, each element of a set may represent a datum (e.g. a value of a parameter) or data (e.g. values of one or more parameters).

The present application, according to some embodiments thereof, is directed at X-ray measurement-based methods and systems for non-destructively mapping the concentration of a (profiled) material within a sample: Electron beams at each of a plurality of landing energies are projected on the sample. Each electron beam penetrates into the sample and excites emission of characteristic X-rays from a respective (probed) region within the sample. The greater the landing energy, the greater the depth about which the probed region is centered.

While characteristic X-ray emission data pertaining to a probed region are indicative of the relative (overall) concentrations of materials included in the probed region, these data are not "localized" in the sense that some state-of-the-art applications require mapping resolutions, which are much finer than the dimensions of the probed regions. The present application teaches how characteristic X-ray emission data from multiple probed regions centered about multiple depths, respectively, may be jointly processed to obtain a high-resolution concentration map of a profiled material included in a sample (thereby overcoming the above-mentioned problem). According to some embodiments, the processing is performed by a neural network. The present application further discloses methods whereby a neural network may be trained to perform such processing. Advantageously, the present application teaches how to amplify a small set of (measured) ground truth data to obtain an arbitrarily larger set of simulated "ground truth" data, which may be used to train the neural network.

Z-Profiling Methods

According to an aspect of some embodiments, there is provided a computer-based method for non-destructive z-profiling of samples (such as patterned wafers and/or semiconductor structures e.g. included in patterned wafers). FIG. 1 presents a flowchart of such a method, a method 100, according to some embodiments. Method 100 includes:

A measurement operation 110, which includes, for each of a plurality of landing energies, performing:
  A suboperation 110a, wherein an electron beam (e-beam) is projected on a sample. The e-beam is configured to penetrate the sample, so as to induce light emitting interactions between electrons from the e-beam (and matter) in the sample within a respective probed region of the sample, whose depth is determined by the landing energy of the e-beam.
  A suboperation 110b, wherein the emitted light (i.e. the light generated by the light emitting interactions) is measured to obtain an optical emission data set pertaining to the probed region.
A data analysis operation 120, wherein, based at least on optical emission data sets (i.e. the measurement data of the emitted light obtained in measurement operation 110) of the probed regions, a concentration map of a material (i.e. a substance; also referred to as "profiled material"), which is included in the sample, is generated. The concentration map quantifies a dependence of the concentration of the profiled material on at least the depth within the sample.

Method 100 may be implemented using a system, such as the system described below in the description of FIG. 6, or systems similar thereto.

According to some embodiments, the concentration map quantifies at least the depth dependence of (i) the mass density or relative mass density (i.e. percentage by weight per unit volume) of the profiled material or (ii) the particle density (e.g. atomic density) or relative particle density (e.g. atomic percent) of the profiled material. The term "particles", when employed in relation to a material, refers to one or more types of atoms and/or one or more types of molecules of which the material is composed. The term "relative particle density", when employed in relation to a first material (e.g. the profiled material), which is included in a specimen, refers to the ratio of the number particles—making up the first material—per unit volume to the total number of particles (i.e. of all of the materials included in the specimen) per unit volume. According to some alternative embodiments, the concentration map characterizes at least a depth dependence of a function of both the mass density and the particle density.

According to some embodiments, at each map coordinate(s), the density of the profiled material is specified to within a respective density range from a plurality of density ranges. That is, the density is given by $i \times \Delta$, wherein $\Delta$ is the magnitude of (each of) the ranges (i.e. the density resolution), and $i$ is a non-negative integer.

Alternatively, according to some embodiments, at each map coordinate(s), the density of the profiled material is specified in terms of a numerical value from a continuous range of numerical values.

According to some embodiments, the sample may include a bulk, such as a semiconductor structure, into which the profiled material has been introduced in order to moderately modify one or more physical properties of the bulk (e.g. to increase electrical conductivity and/or capacitance). According to some embodiments, the bulk may be or include a plurality of thin layers stacked one on top of the other. Each of the layers may be composed of a respective bulk material(s) (e.g. a respective semiconductor material(s)). According to some such embodiments, the profiled material may define a vertical gradient across the layers. According to some embodiments, the sample may be or include one or more memory components and/or logic components (such as a gate stack, for example, a high-k metal gate stack) and the profiled material may include fluorine nitrogen, boron, and/or gallium.

As used herein, according to some embodiments, the term "intended design", when employed in relation to a sample including a bulk with a profiled material introduced thereinto, refers to at least to design data of the bulk. According to some such embodiments, the intended design may additionally specify the nominal distribution of the profiled material within the bulk.

According to some embodiments, the intended design of the sample is known and is used to obtain the concentration map of the profiled material in data analysis operation 120.

More generally, according to some embodiments, reference data, pertaining to the sample, may be used to obtain the concentration map of the profiled material in data analysis operation 120. As used herein, the term "reference data" may refer to structural information of a (first) sample, which (i.e. the structural information) is initially available (i.e. prior to implementing method 100). The structural information may include (i) design data of the sample and/or (ii) measured structural data obtained by profiling other samples of the same design intent as the first sample or even samples from the same batch (e.g. when the sample is a wafer) as the first sample. Measured structural data may slightly vary from design data in additionally reflecting systemic production imperfections. In particular, it is to be understood that the term "reference data" may be used to refer to design data and/or measured structural data; the measured structural data being obtained by profiling other samples of the same design intent as the first sample.

According to some embodiments, the emitted light is or includes X-rays, and, in particular, characteristic X-rays. Parameters of each e-beam, particularly the landing energy of the e-beam, are selected so as to induce in suboperation 110a emission of characteristic X-rays by particles (specifically, particles of the profiled material) in a probed region centered about a respective depth, which is determined by the landing energy of the e-beam. Emitted X-ray light is measured in suboperation 110b to obtain the optical emission data set of the probed region. (That is, the optical emission data set of suboperation 110b is, or includes, one or more measured parameters characterizing the emitted X-ray light.) More precisely, each probed region may correspond to a respective volume of the sample, wherein electrons in the respective e-beam may cause ejections of electrons in the inner shells of atoms (in the probed region), leaving each of these atoms with an inner shell vacancy. The inner shell vacancy may be filled through the relaxation an outer shell electron to the inner shell. The relaxation may be accompanied by emission of a photon (having energy equal to the energy lost by the electron in transitioning from the outer shell to the inner shell).

According to some embodiments, the sample is a patterned wafer or a part of a patterned wafer. According to some embodiments, the sample is a semiconductor structure. According to some such embodiments, the semiconductor structure may be included in a patterned wafer. According to some embodiments, the sample may be or include one or more logic components (e.g. a fin FET (FinFET) and/or a gate-all-around (GAA) FET) and/or memory components (e.g. a dynamic RAM and/or a vertical NAND (V-NAND)).

According to some embodiments, suboperation 110b may be implemented using a spectrometer, which is configured to partially or fully a measure a spectrum (including intensities) of the emitted light (generated in suboperation 110a), thereby obtaining the respective optical emission data set. According to some embodiments, the spectrometer may be configured to measure light in the X-ray range. According to some such embodiments, suboperation 110b may be implemented using an energy-dispersive X-ray spectrometer or a wavelength-dispersive X-ray spectrometer.

More generally, according to some embodiments, in suboperation 110b one or more parameters of the emitted light may be measured, thereby obtaining the respective optical emission data set. According to some embodiments, the one or more measured parameters may include at least the number of emitted photons, of a specific frequency (e.g. the peak characteristic X-ray emission frequency of the profiled material) or in a frequency range (e.g. centered about the peak characteristic X-ray emission frequency of the profiled material), which exit the sample onto a respective solid angle (e.g. defined by a positioning of a spectrometer and the depth of the probed region). According to some embodiments, the one or more measured parameters may include the numbers of emitted photons, per each of a plurality of frequencies or frequency ranges. As a non-limiting example, the plurality of frequencies may include the peak characteristic X-ray emission frequency of the profiled material (i.e. the frequency of the most intense line in the X-ray emission spectrum of the profiled material) and the frequency of the second tallest characteristic X-ray emission peak of the profiled material (i.e. the frequency of the second most intense line in the X-ray emission spectrum of the profiled material).

According to some embodiments, in data analysis operation 120, in addition to the intensities of one or more characteristic X-ray lines (pertaining to the profiled material), parameters characterizing the "background" X-ray radiation—that is, a continuous contribution to the emitted X-ray light due to Bremsstrahlung—are also taken into account in generating the concentration map of the profiled material.

According to some embodiments, an image sensor may be used to sense the emitted light in each of the implementations of suboperation 110b, thereby obtaining the optical emission data sets. More specifically, in each implementation of suboperation 110b, the image sensor senses the emitted light to obtain one or more two-dimensional images. According to some embodiments, the image sensor may be configured to sense only light at a specific frequency (e.g. the peak characteristic X-ray emission frequency of the profiled material) or in a frequency range (e.g. centered about the peak characteristic X-ray emission frequency of the profiled material). According to some embodiments, the image sensor may be configured to sense only light at each of a plurality of frequencies (e.g. the peak characteristic X-ray emission frequency of the profiled material, and the emission frequency corresponding to the second tallest characteristic X-ray peak of the profiled material) or frequency ranges (e.g. centered about the peak characteristic X-ray emission frequency of the profiled material, and the emission frequency of the second tallest characteristic X-ray peak of the profiled material).

According to some embodiments, each pixel on the image sensor may be configured to partially or fully a measure a spectrum (e.g. in an X-ray range) of the emitted light (generated in suboperation 110a). That is, in such embodiments, each pixel functions as spectrometer.

Method 100 may be used to provide a one-dimensional concentration map of a profiled material included in a sample or a three-dimensional concentration map of a profiled material included in a sample (or a two-dimensional concentration map of a profiled material included in a sample). Each possibility corresponds to separate embodiments. In the latter case (i.e. in embodiments wherein method 100 is used for three-dimensional profiling), and as described in detail below in the description of FIGS. 3-5, measurement operation 110 is serially implemented with respect to each of a plurality of lateral (i.e. horizontal) locations on the sample (e.g. on the top surface of the sample) at which the respective e-beams impinge.

First, the one-dimensional case is described in detail. To this end, reference is additionally made to FIGS. 2A-2D. FIGS. 2A-2D schematically depict an implementation of measurement operation 110 of method 100, according to some embodiments thereof, wherein a one-dimensional concentration map of a profiled material included in a sample (e.g. a semiconductor structure) is to be obtained.

Figure 2B:
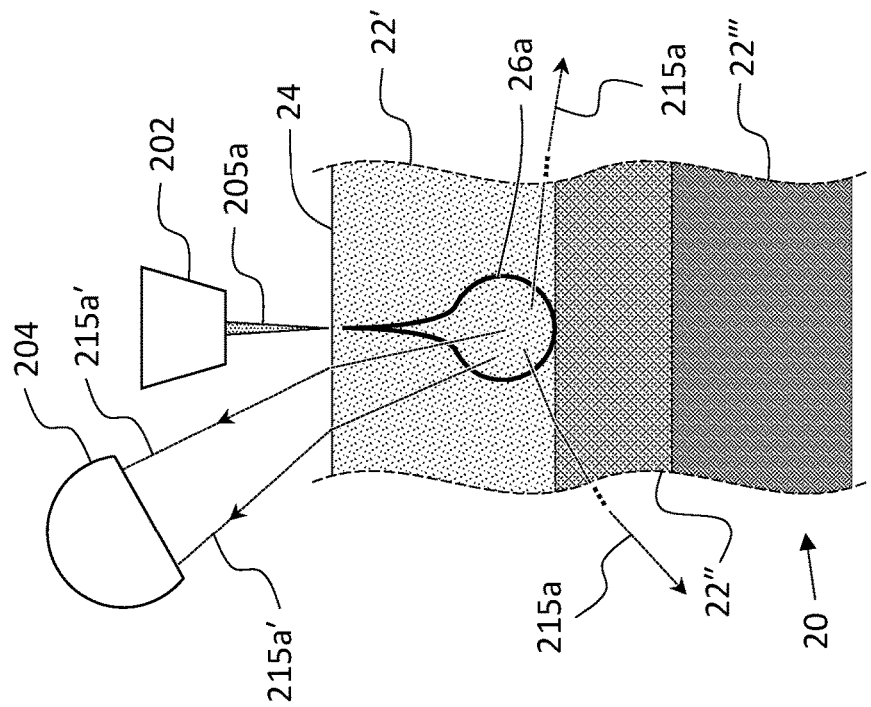
FIG. 2A-2D schematically depict a sample undergoing z-profiling in accordance with the method of FIG. 1, according to some embodiments.
Figure 2A:
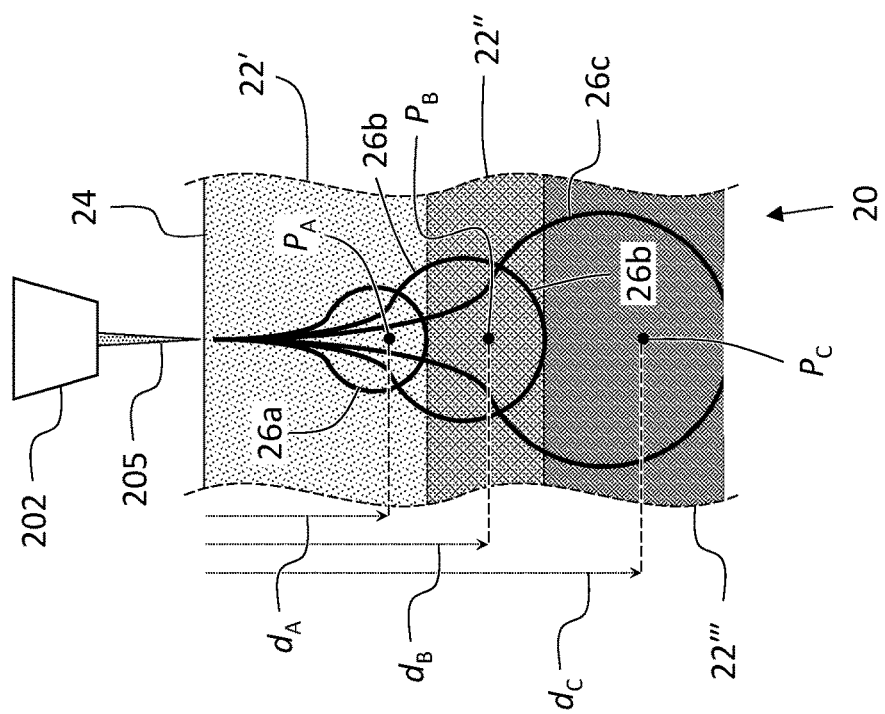

FIG. 2A shows a cross-sectional view of a sample 20 being probed by an e-beam in accordance with measurement operation 110. To facilitate the description by rendering it more concrete, it is assumed that sample 20 includes a plurality of lateral (i.e. horizontal) layers 22 with at least some of layers 22 differing from one another in material composition, whether in terms of bulk material and/or in the overall concentration of the profiled material. According to some embodiments, at least some of layers 22 may differ from one another in thickness.

As a non-limiting example, in FIGS. 2A-2D sample 20 is shown as including three layers disposed one on top of the other: a first layer 22', a second layer 22", and a third layer 22'''. First layer 22' is disposed above second layer 22". Second layer 22" is sandwiched between first layer 22' and third layer 22'''. The top surface of first layer 22' constitutes an external surface 24 of sample 20. Also shown is an electron beam (e-beam) source 202 and an e-beam 205 produced thereby, so as to impinge (e.g. normally impinge) on external surface 24. E-beam source 202 is configured to project e-beams (one at a time) at each of a plurality of landing energies, thereby implementing suboperation 110a.

The greater the landing energy of e-beam 205, the greater the depth to which electrons from e-beam 205 will (on average) penetrate into sample 20. Further, the greater the landing energy of e-beam 205, the greater may be the volume within the sample wherein electrons from e-beam 205 interact with matter in sample 20 so as to induce emission of characteristic X-rays. This is exemplified in FIG. 2A via three probed regions 26: A first probed region 26a corresponds to the volume in which about all (e.g. at least 80%, at least 90%, or at least 95%) of the characteristic X-ray (i.e. X-ray light) emitting interactions will occur due to the penetration into sample 20 of an e-beam at a first landing energy $E_1$. A second probed region 26b corresponds to the volume in which about all of the characteristic X-ray emitting interactions will occur due to the penetration into sample 20 of an e-beam at a second landing energy $E_2$. A third probed region 26c corresponds to the volume in which about all of the characteristic X-ray emitting interactions will occur due to the penetration into sample 20 of an e-beam at a third landing energy $E_3$. First probed region 26a is centered about a first point $P_A$ at a depth $d_A$, second probed region 26b is centered about a second point $P_B$ at a depth $d_B$, and third probed region 26c is centered about a third point $P_C$ at a depth $d_C$. $E_1 < E_2 < E_3$. Accordingly, $d_A < d_B < d_C$. According to some embodiments, and as depicted in FIG. 2A, third probed region 26c is of greater size than second probed region 26b, which is of greater size than first probed region 26a.

The required depth resolution of the concentration map dictates the number of landing energies. In particular, the greater the required depth resolution, the greater the number of landing energies utilized. (The minimum and maximum depths, to which a sample is profiled, are determined by the smallest and greatest landing energies, respectively.) Accordingly, the distances between centers of successive (probed) regions (e.g. the distance $d_B - d_A$ between $P_A$ and $P_B$, the distance $d_C - d_B$ between $P_B$ and $P_C$), are dictated by the required resolution of the concentration map. According to some embodiments, the depth resolution is selected to be sufficiently high to detect and "pin-point" changes in the concentration of the profiled material. For example, in the z-profiling of sample 20, the depth resolution may be selected to be greater than the thickness of the thinnest of layers 22.

FIG. 2B shows a first e-beam 205a—generated by e-beam source 202 and having the first landing energy $E_1$—incident on sample 20. Also delineated is first probed region 26a (in which about all the characteristic X-ray emitting interactions, induced by first e-beam 205a, occur). X-rays may be emitted in all directions, as exemplified by X-rays 215a. X-rays 215a' indicate X-rays (from X-rays 215a), which arrive at a light sensing module 204.

Figures 2C, 2D:
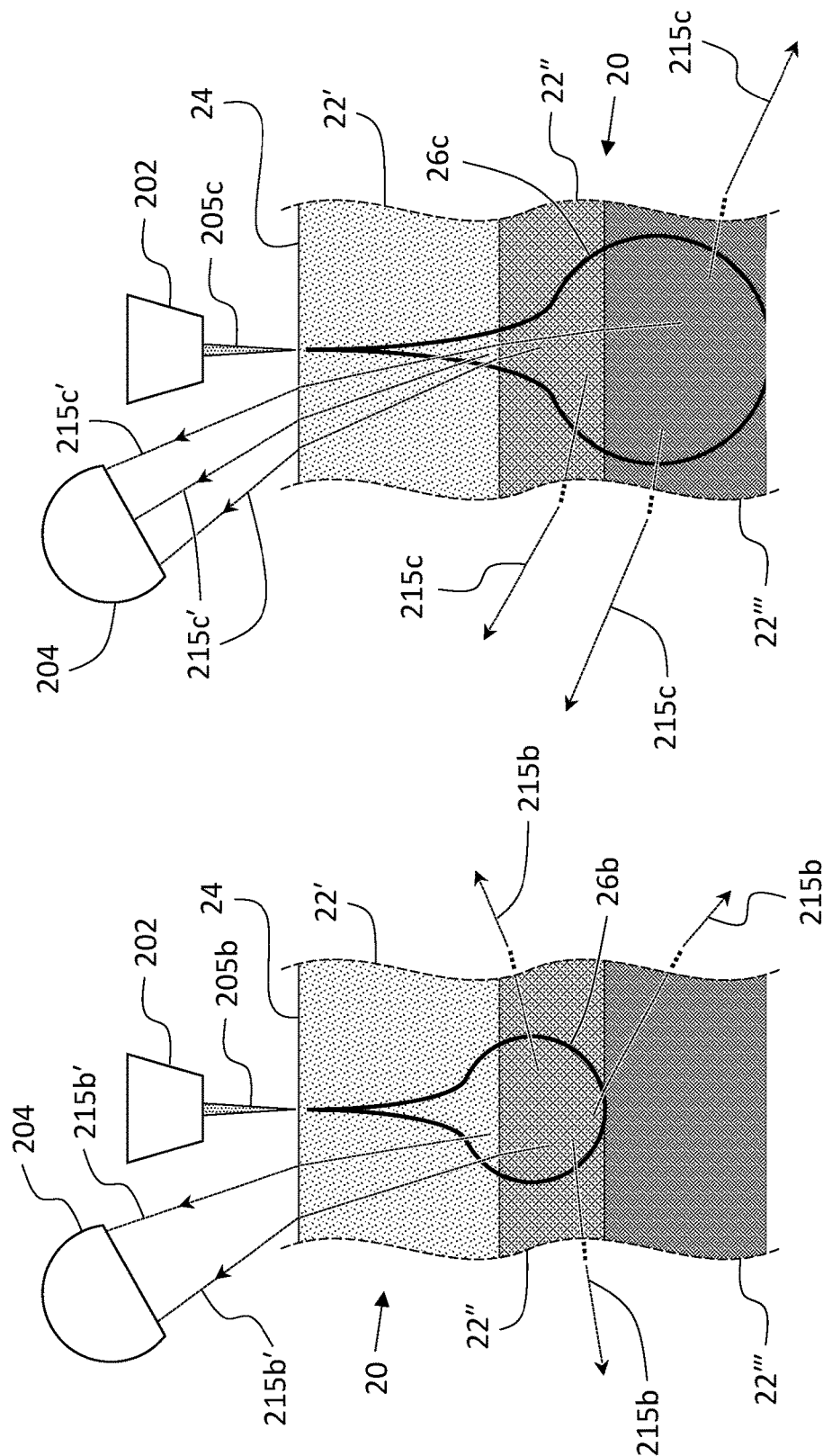

FIG. 2C shows a second e-beam 205b—generated by e-beam source 202 and having the second landing energy $E_2$—incident on sample 20. Also delineated is second probed region 26b (in which about all the characteristic X-ray emitting interactions, induced by second e-beam 205b, occur). X-rays may be emitted in all directions, as indicated by X-rays 215b. X-rays 215b' indicate X-rays (from X-rays 215b), which arrive at light sensing module 204.

FIG. 2D shows a third e-beam 205c—generated by e-beam source 202 and having the third landing energy $E_3$—incident on sample 20. Also delineated is third probed region 26c (in which about all the characteristic X-ray emitting interactions, induced by third e-beam 205c, occur). X-rays may be emitted in all directions, as indicated by X-rays 215c. X-rays 215c' indicate X-rays (from emitted X-rays 215c), which arrive at light sensing module 204.

While in FIGS. 2B-2D, layers 22 are depicted as differing from one another in their respective refractive indices (as evinced by the refraction of the light rays on transition from one layer to another), it is to be understood that method 100 is equally applicable without such differences being present.

For each of the landing energies (e.g. landing energies $E_1$, $E_2$, and $E_3$), respective X-ray emission data sets (including characteristic X-ray emission data) may be obtained by light sensing module 204, thereby implementing suboperation 110b. Each X-ray emission data set may contain information regarding the average concentration of the profiled material in the respectively probed region. By obtaining a plurality of X-ray emission data sets, pertaining to a sufficiently large number of (different) landing energies, and analyzing the plurality of X-ray emission data sets (for example, using a machine learning (ML) derived algorithm, such as a trained neural network (NN)), the dependence of the concentration of the profiled material on the depth may be extracted (in data analysis operation 120).

More specifically, since each material is characterized by a unique set of spectral lines (in the X-ray range) corresponding to the energy differences between orbitals of elements and/or compounds making up the material, a probed region, which includes a plurality of different materials, will be characterized by a composite set of spectral lines that is a combination of the sets of spectral lines characterizing each of the materials. The ratios of the measured intensities of the spectral lines of a first material (e.g. introduced into the sample), which is included in the probed region, to the measured intensities of the spectral lines of a second material (e.g. a semiconductor), which is included in the probed region, depend on the ratio of their concentrations. In particular, the ratio of the measured intensities of the most intense spectral line of the first material to the most intense spectral line of the second material depends on the ratio of their concentration (e.g. the ratio of the average particle density of the first material to the average particle density of the second material). The greater the concentration of a material, the greater the measured intensity of the spectral lines pertaining thereto.

For each probed region, the ratio of concentrations of a first material, included therein, to a second material, included therein, may, in principle, be obtained from the ratios of the measured intensities of the spectral lines (e.g. the ratio of the most intense spectral lines). In particular, when the concentration of the second material is known, the concentration of the first material may be computed based on the obtained ratios. According to some embodiments, the second material may be a semiconductor, which makes up the bulk of the probed region, and the first material may be an element(s) (e.g. fluorine, nitrogen, boron, and/or gallium) introduced into the semiconductor to tweak one or more physical properties thereof. To obtain more localized information (i.e. the spatial dependence of the concentration to higher resolution), emission spectra of other probed regions may be taken into account.

According to some embodiments, the concentration map may be obtained as the output of a trained NN, which is configured to receive as inputs the optical emission data sets (e.g. optical emission spectra)—obtained in each of the implementations of measurement operation 110—each labelled by the respective landing energy.

According to some embodiments, wherein at each map coordinate(s) the concentration map (output by the NN) specifies the density of the profiled material to within a respective density range from a plurality of density ranges, the NN may be a classification NN. According to some embodiments, the density ranges may be complimentary in the sense of jointly constituting a continuous range of densities.

According to some embodiments, wherein at each map coordinate(s) the concentration map specifies the density of the profiled material to a respective (single) numerical value, the NN may be a regression NN.

According to some embodiments, the NN may be a deep NN (DNN), such as a convolutional NN (CNN) or a fully connected NN. According to some embodiments, the NN may be composed of a variational autoencoder (VAE) and a classifier (for example, a support vector machine (SVM) or a DNN). In such embodiments, the optical emission data sets, are input into the VAE, which is configured to extract therefrom latent variables. The latent variables, each labelled by the respective landing energy, serve as inputs to the classifier, which is configured to output the concentration map. Alternatively, according to some embodiments, the NN may be a multi-head VAE. According to some embodiments, the NN may be a generative adversarial network (GAN). According to some embodiments, wherein the NN is a classification NN, the NN may be a VGG NN or a ResNet.

According to some embodiments, the NN may be configured to generate the concentration map based on measured intensities of the emitted light at two or more frequencies (e.g. the peak characteristic X-ray emission frequency of the profiled material and the emission frequency of the second tallest characteristic X-ray peak of the profiled material). According to some such embodiments, the NN may be configured to generate the concentration map based on measured spectra of the emitted light.

Alternatively, according to some embodiments, including some embodiments wherein in measurement operation 110 the intensities are measured for a plurality of frequencies (e.g. using a spectrometer), the NN may be configured to receive as inputs the measured intensities of (the emitted) light at a single frequency (e.g. the peak characteristic X-ray emission frequency of the profiled material). In some such embodiments, wherein in measurement operation 110 the intensities are measured for a plurality of frequencies, prior to running the NN, optical emission data, corresponding to all the measured frequencies, may be preprocessed (e.g. to remove noise).

The Training Methods Subsection below describes various ways whereby a NN may be trained to obtain the distribution of a profiled material in a sample from optical emission data sets of a sample, which pertain to a plurality of e-beam landing energies, respectively.

According to some embodiments, wherein a spectrometer is used to obtain the optical emission data sets, data analysis operation 120 may include an initial preprocessing suboperation, wherein the optical emission data may be preprocessed to remove noise.

The skilled person will perceive that method 100 may be used to validate the (nominal) concentration a material in sample. More specifically, method 100 may be used to quantify small variations (e.g. to within 1%, 3%, or even 5%) from a nominal distribution of a material in a sample. The nominal distribution is known and is taken into account in data analysis operation 120 in computing the variations. According to some embodiments, at each map coordinate(s) the concentration map may specify the difference between the actual density and the nominal density (which may be specified in terms of mass density, relative mass density, particle density, or relative particle density). According to some embodiments, at each map coordinate(s) the concentration map may specify the actual density (which may be specified in terms of mass density, relative mass density, particle density, or relative particle density)—i.e. the density computed in data analysis operation 120. It is noted that the validated material (i.e. the material whose nominal concentration is validated) is not limited to materials, such as nitrogen and fluorine, which are typically introduced into a semiconductor bulk. In particular, the validated material may be a semiconductor. According to some embodiments, method 100 may be used to validate the concentrations of two or more materials included in a sample.

Figure 3:
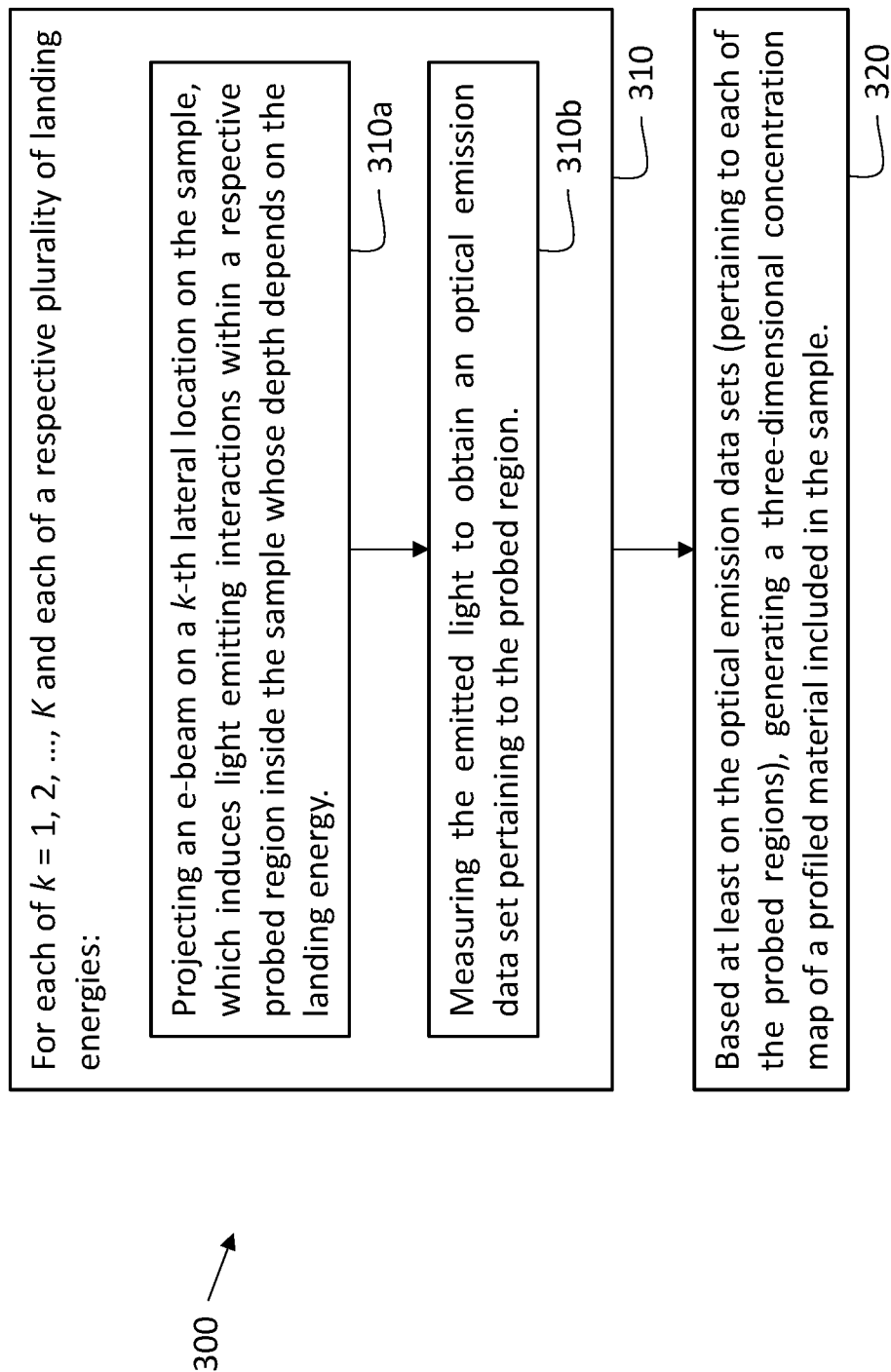
FIG. 3 presents a flowchart of a method for three-dimensional concentration mapping of profiled materials in specific embodiments of the method of FIG. 1, wherein the z-profiling is three-dimensional.

FIG. 3 presents a flowchart of a method 300 for three-dimensional concentration mapping of profiled materials in samples. Method 300 corresponds to specific embodiments of method 100. Method 300 includes:

A measurement operation 310, wherein, for each (integer) k from 1 to $N_L$, and for each of a respective plurality of landing energies (that is, different k may have associated therewith different pluralities of landing energies, which may differ in values and/or in number):

A suboperation 310a, wherein an e-beam is projected on a sample at a k-th lateral location on the sample. The e-beam is configured to penetrate the sample so as to induce light-emitting interactions between electrons from the e-beam and (matter in) the sample within a respective probed region, whose depth is determined by the landing energy of the e-beam.

A suboperation 310b, wherein the emitted light is measured to obtain an optical emission data set pertaining to the probed region.

A data analysis operation 320, wherein, based at least on the optical emission data sets of the probed regions, a three-dimensional concentration map of the profiled material is generated.

The skilled person will readily perceive that the order at which the above operations and suboperations are listed is not unique. Other applicable orders are also covered by the present disclosure. For example, according to some embodiments, data analysis operation 320 may be commenced prior to the conclusion of measurement operation 310. The skilled person will further perceive that method 300 may also be employed to obtain a two-dimensional (defined by the depth dimension and at least one lateral dimension) concentration map of a profiled material in a sample.

In data analysis operation 320, optical emission data sets of probed regions, which are laterally displaced with respect to a given probed region (e.g. laterally adjacent to the given probed region), are additionally taken into account in determining the distribution of the profiled material within the given probed region. Accordingly, in measurement operation 310, the density of the $N_L$ lateral locations is dictated by the required lateral resolution(s) of the concentration map.

According to some embodiments, method 300 may be based on measurement of X-rays, and, in particular, characteristic X-rays. According to some embodiments, measurement operation 310 may be implemented by applying energy-dispersive X-ray spectroscopy (EDXS) techniques or wavelength-dispersive X-ray spectroscopy (WDXS) techniques.

According to some embodiments, in the implementations of suboperation 310b an image sensor may be employed. According to some such embodiments, each pixel on the image sensor may be configured to partially or fully a measure the spectrum (e.g. in an X-ray range) of the emitted light.

Figure 4A:
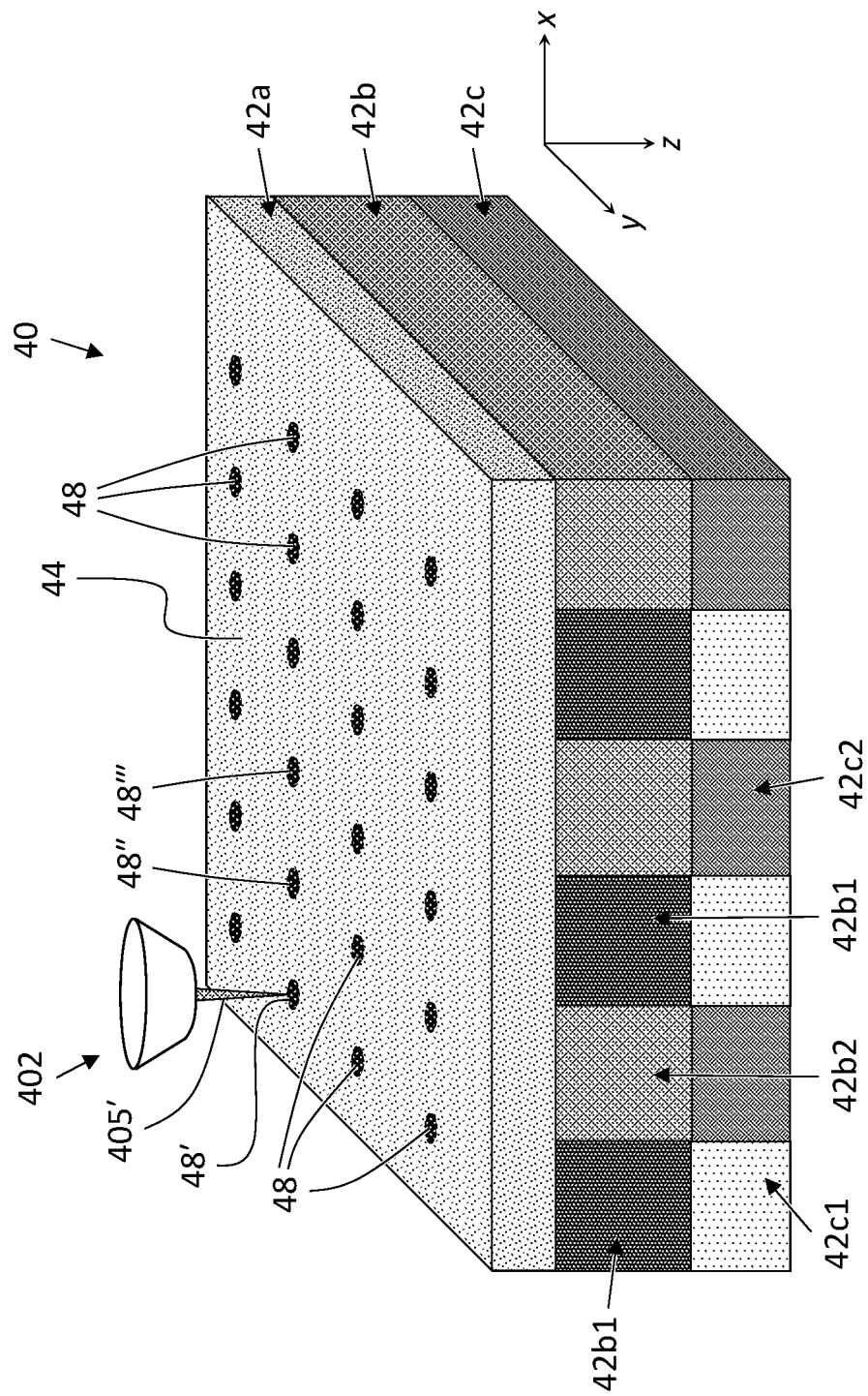
FIGS. 4A and 4B schematically depict a sample undergoing z-profiling in accordance with the method of FIG. 3, according to some embodiments thereof.
Figure 4B:
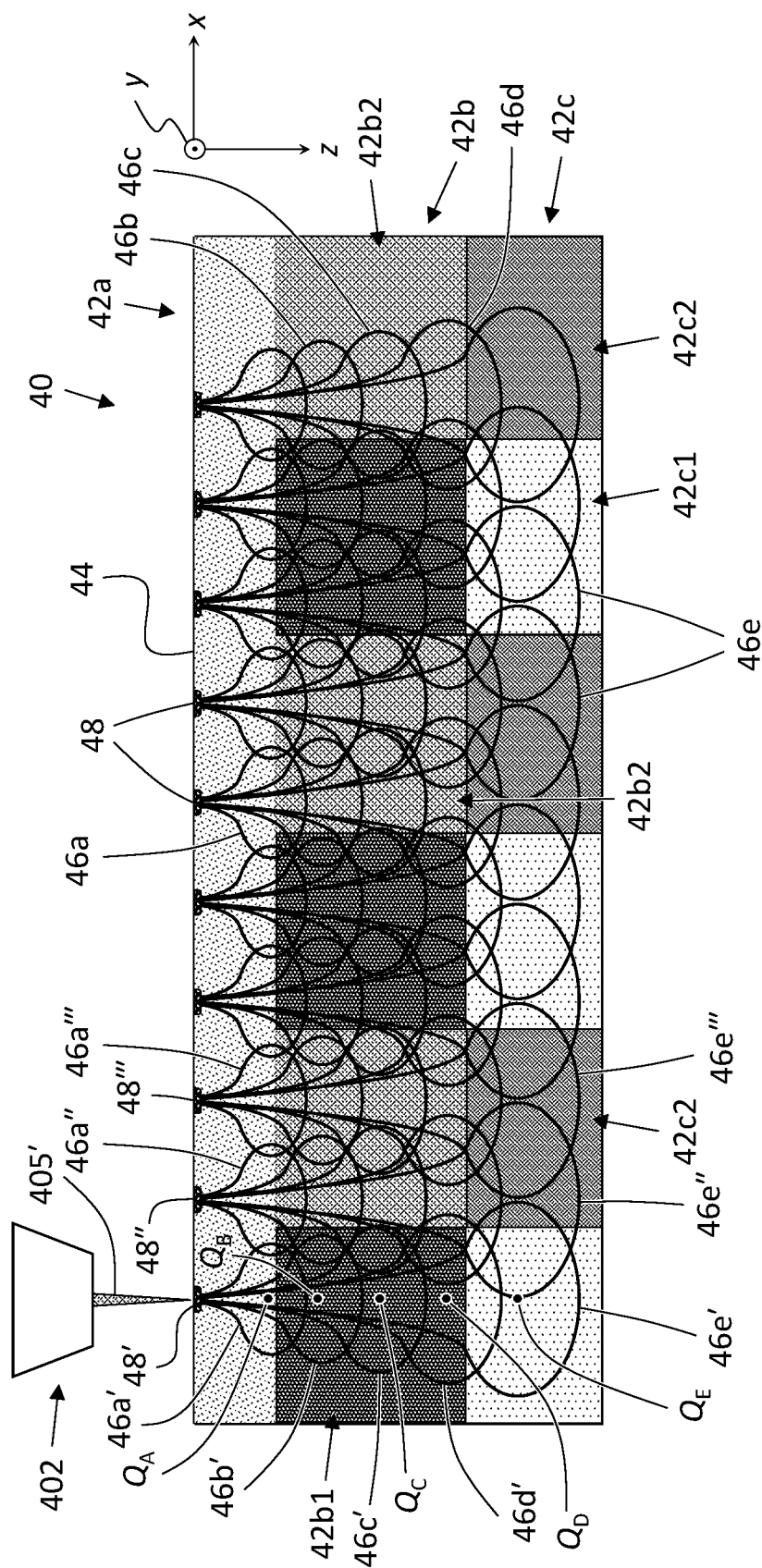

To facilitate the description, in addition to FIG. 3, reference is also made to FIGS. 4A and 4B, which schematically depict an implementation of method 300, according to some embodiments. FIG. 4A shows a perspective view of a sample 40 being probed by an e-beam in accordance with measurement operation 310. Sample 40 may include a plurality of layers 42. To facilitate the description, it is assumed that at least some of layers 42 differ from one another in bulk material(s) and in the concentration of the profiled material. According to some embodiments, at least some of layers 42 may differ from one another in dimensions thereof. According to some embodiments, at least some of layers 42 may differ from one another in internal geometries thereof. According to some such embodiments, wherein layers 42 are shaped, or nominally shaped, as horizontally disposed slabs, at least some of layers 42 may differ from one another in thickness.

As a non-limiting example, in FIG. 4A sample 40 is shown as including three layers disposed one on top of the other: a first layer 42a, a second layer 42b, and a third layer 42c. First layer 42a is disposed above second layer 42b. Second layer 42b is sandwiched between first layer 42a and third layer 42c. The top surface of first layer 42a constitutes an external surface 44 of sample 40.

Second layer 42b is non-uniform by design and includes two types of segments: first segments 42b1 and second segments 42b2 (not all of which are numbered in FIGS. 4A and 4B). Each of first segments 42b1 and each of second segments 42b2 extends in parallel to the y-axis. First segments 42b1 and second segments 42b2 are alternately disposed. According to some embodiments, first segments 42b1 differ from second segments 42b2 in the material composition thereof, whether in terms of constituents and/or densities of same constituents. According to some embodiments, first segments 42b1 may be composed of a first semiconductor material and second segments 42b2 may be composed of a second semiconductor material. Additionally, and/or alternatively, according to some embodiments, an intended concentration of the profiled material in second segments 42b2 may differ from an intended concentration of the profiled material in first segments 42b1.

Similarly, third layer 42c is non-uniform by design and includes two types of segments: third segments 42c1 and fourth segments 42c2 (not all of which are numbered in FIGS. 4A and 4B). Each of third segments 42c1 and each of fourth segments 42c2 extends in parallel to the y-axis. Third segments 42c1 and fourth segments 42c2 are alternately disposed. According to some embodiments, third segments 42c1 differ from fourth segments 42c2 in the material composition thereof, whether in terms of constituents and/or densities of same constituents. According to some embodiments, third segments 42c1 may be composed of a third semiconductor material and fourth segments 42c2 may be composed of a fourth semiconductor material. Additionally, and/or alternatively, according to some embodiments, an intended concentration of the profiled material in fourth segments 42c2 may differ from an intended concentration of the profiled material in third segments 42c1. According to some embodiments, and as depicted in FIGS. 4A and 4B, third segments 42c1 are positioned below first segments 42b1, respectively, and fourth segments 42c2 are positioned below second segments 42b2, respectively.

Also shown is an e-beam source 402. E-beam source 402 is configured to project e-beams (one at a time) on external surface 44. Also indicated are (lateral) locations 48 on external surface 44, on which the e-beams are directed. For example, in FIG. 4A, e-beam source 402 is shown generating an e-beam 405, which impinges (e.g. normally impinges) on external surface 44 at a lateral location 48' (from lateral locations 48). At least some of the e-beams projected on the same location differ from one another in landing energy, so that sample 40 is probed (beneath lateral location 48') at a plurality of depths. According to some embodiments, lateral locations 48 may be so distributed so as to define a lattice, for example, a square lattice.

Referring also to FIG. 4B, FIG. 4B presents a cross-sectional view of sample 40 that reveals probed regions 46 therein, according to some embodiments of method 300, and, in particular measurement operation 310. As a non-limiting example intended to facilitate the description by making it more concrete, in FIG. 4B, at each of lateral locations 48, five landing energies are shown applied. Each of probed regions 46a corresponds to a respective volume in which about all (e.g. at least 80%, at least 90%, or at least 95%) of the characteristic X-ray emitting interactions will occur due to the penetration of an e-beam at a respective first landing energy into sample 40 via a respective location from lateral locations 48. For example, a first (top) probed region 46a' (from probed regions 46a) corresponds to the volume in which about all of the characteristic X-ray emitting interactions will occur due to the penetration of an e-beam at a first landing energy $E_1'$ into sample 40 via lateral location 48'.

Each of probed regions 46b corresponds to a respective volume in which about all of the characteristic X-ray emitting interactions will occur due to the penetration of an e-beam at a respective second landing energy (greater than the respective first landing energy) into sample 40 via a respective location from lateral locations 48. For example, a second probed region 46b' (from probed regions 46b) corresponds to the volume in which about all of the characteristic X-ray emitting interactions will occur due to the penetration of an e-beam at a second landing energy $E_2'>E_1'$ into sample 40 via lateral location 48'.

Each of probed regions 46c corresponds to a respective volume in which about all of the characteristic X-ray emitting interactions will occur due to the penetration of an e-beam at a respective third landing energy (greater than the respective second landing energy) into sample via a respective location from lateral locations 48. For example, a third probed region 46c' (from probed regions 46c) corresponds to the volume in which about all of the characteristic X-ray emitting interactions will occur due to the penetration of an e-beam at a third landing energy $E_3'>E_2'$ into sample 40 via lateral location 48'.

Each of probed regions 46d corresponds to a respective volume in which about all of the characteristic X-ray emitting interactions will occur due to the penetration of an e-beam at a respective fourth landing energy (greater than the third landing energy) into sample 40 via a respective location from lateral locations 48. For example, a fourth probed region 46d' (from probed regions 46d) corresponds to the volume in which about all of the characteristic X-ray emitting interactions will occur due to the penetration of an e-beam at a fourth landing energy $E_4'>E_3'$ into sample 40 via lateral location 48'.

Each of probed regions 46e corresponds to a respective volume in which about all of the characteristic X-ray emitting interactions will occur due to the penetration of an e-beam at a respective fifth landing energy (greater than the fourth landing energy) into sample 40 via a respective location from lateral locations 48. For example, a fifth (bottom) probed region 46e' (from probed regions 46e) corresponds to the volume in which about all of the characteristic X-ray emitting interactions will occur due to the penetration of an e-beam at a fifth landing energy $E_5'>E_4'$ into sample 40 via lateral location 48'.

First probed region 46a' is centered about a first point $Q_A$ at a depth $b_A$, second probed region 46b' is centered about a second point $Q_B$ at a depth $b_B$, third probed region 46c' is centered about a third point $Q_C$ at a depth $b_C$, fourth probed region 46d' is centered about a fourth point $Q_D$ at a depth $b_D$, and fifth probed region 46e' is centered about a fifth point $Q_E$ at a depth $b_E$. $E_1'<E_2'<E_3'<E_4'<E_5'$. Accordingly, $b_A<b_B<b_C<b_D<b_E$. According to some embodiments, and as depicted in FIG. 4B, fifth probed region 46e' is of a greater size than fourth probed region 46d', which is of a greater size than third probed region 46c', which is of a greater size than second probed region 46b', which is of a greater size than first probed region 46a'. Also indicated are a lateral location 48" and a lateral location 48'" (from lateral locations 48). Each of lateral locations 48' and 48'" is adjacent to lateral location 48", which is positioned there between. A (top) probed region 46a", from probed regions 46a, corresponds to the volume in which about all of the characteristic X-ray emitting interactions will occur due to the penetration of an e-beam at a respective first landing energy into sample 40 via lateral location 48". A (bottom) probed region 46e", from probed regions 46e, corresponds to the volume in which about all of the characteristic X-ray emitting interactions will occur due to the penetration of an e-beam at a respective fifth landing energy into sample 40 via lateral location 48". A (top) probed region 46a'", from first probed regions 46a, corresponds to the volume in which about all of the characteristic X-ray emitting interactions will occur due to the penetration of an e-beam at a respective first landing energy into sample 40 via lateral location 48'". A (bottom) probed region 46e'", from probed regions 46e, corresponds to the volume in which about all of the characteristic X-ray emitting interactions will occur due to the penetration of an e-beam at a respective fifth landing energy into sample 40 via lateral location 48'".

landing energies, applied at locations which differ in their x-coordinates, may differ. Thus, for example, since lateral location 48' is positioned above one of first segments 42b1 and one of third segments 42c1 while lateral location 48'" is positioned above one of second segments 42b2 and one of fourth segments 42c2, according to some embodiments, $\{E_i'''\}_{i=1}^5 \neq \{E_i'\}_{i=1}^5$, wherein and $\{E_i'\}_{i=1}^5$ is the set of landing energies corresponding to e-beams applied via lateral location 48' and $\{E_i'''\}_{i=1}^5$ is the set of landing energies corresponding to e-beams applied via lateral location 48'".

Example embodiments, wherein sets of landing energies may be selected to differ from one another depending on the respective lateral locations on which the e-beams are projected, include first segments 42b1 being denser than second segments 42b2, so that in order to penetrate first segments 42b1 to the same depth as second segments 42b2, a greater landing energy may be required. If, in addition, third segments 42c1 are denser than fourth segments 42c2, in order to ensure that sample 40 is probed to about the same depth beneath each of lateral locations 48' and 48'", for each i, $E_i'$ may be greater than $E_i'''$. Other example embodiments, wherein sets of landing energies may be selected to differ from one another depending on the respective lateral locations on which the e-beams are projected, include first segments 42b1 and third segments 42c1 being less electrically conducting than second segments 42b2 and fourth segments 42c2, respectively.

The distances between adjacent locations from lateral locations 48 (and therefore the distances between the centers of laterally adjacent probed regions) are selected based on the required lateral resolution (which may or may not be equal to the required vertical resolution may be the same). It is noted that while in FIG. 4B laterally adjacent probed regions are shown as overlapping, depending on the required lateral resolution, according to some other embodiments, some laterally adjacent probed regions (centered about smaller depths), or even all of the laterally probed regions, may not overlap. According to some embodiments, the lateral resolution is selected to be sufficiently high to detect and "pin-point" changes in the concentration of the profiled material. Accordingly, the distance between adjacent lateral locations (from lateral locations 48) may be selected to be smaller than the width of first segments 42b1 as well as the width of second segments 42b2.

Figure 5:
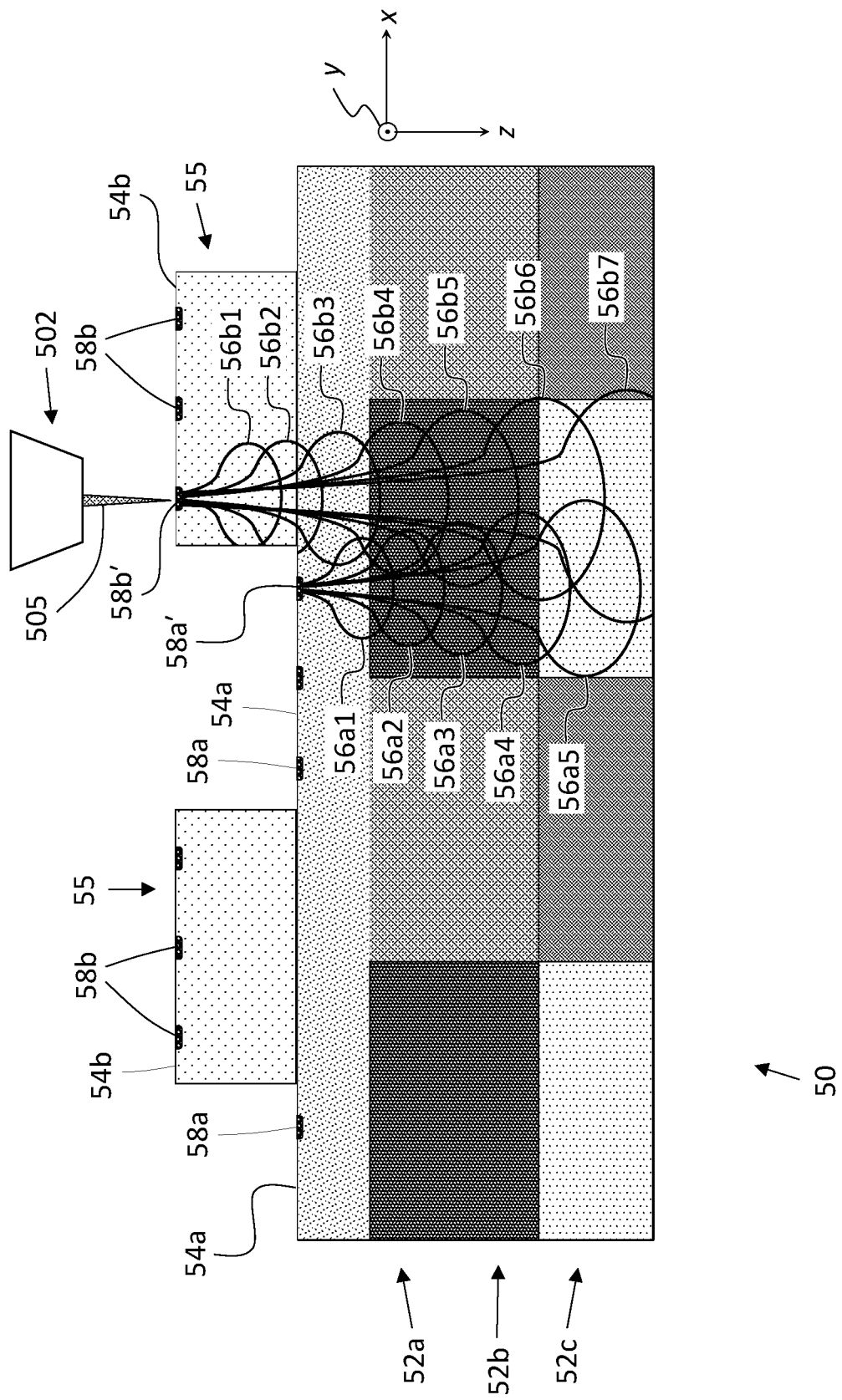
FIG. 5 schematically depicts a sample undergoing z-profiling in accordance with the method of FIG. 3, according to some embodiments thereof.

While in FIGS. 4A and 4B external surface 44 is depicted as flat, it is to be understood that method 300 may be applied to samples, which do not have a flat top surface or any extended flat surface. In particular, method 300 may be applied to samples whose top surface includes areas at different elevations with respect to a lowest disposed area(s). FIG. 5 depicts an implementation of method 300 to such a sample, a sample 50, according to some embodiments. As a non-limiting example, sample 50 is shown as including a first layer 52a, a second layer 52b, and a third layer 52c, which are disposed one on top of the other. Sample 50 further includes projecting structures 55, which are positioned on top of first layer 51 and project therefrom in the direction of the negative z-axis. Projecting structures 55 jointly have smaller lateral dimensions than first layer 52a, so that a top surface of sample 50, constituted by an external surface 54, includes two (discontinuous) lateral surfaces of different elevation: a first surface 54a and a second surface 54b. First surface 54a constitutes the top external surface of first layer 52a. Second surface 54b includes the top surfaces of projecting structures 55. According to some embodiments, projecting structures 55 may have a different material composition than any of layers 52a, 52b, and 52c.

Also shown is an e-beam source 502 and an e-beam 505 produced thereby, so as to impinge (e.g. normally impinge) on external surface 54. First lateral locations 58a (not all of which are numbered) on first surface 54a indicate locations at which, in operation 310, e-beams projected by e-beam source 502 strike first surface 54a (so as to probe layers 52a, 52b, and 52c there beneath). Second lateral locations 58b on second surface 54b indicate locations at which, in operation 310, e-beams projected by e-beam source 502 strike second surface 54b (so as to probe projecting structures 55 and layers 52a, 52b, and 52c there beneath). E-beams having a first set of landing energies may be directed at each of first lateral locations 58a, respectively, and e-beams having a second set of landing energies may be directed at each of second lateral locations 58b, respectively. In order to probe sample 50 to the full depth thereof beneath both first surface 54a and second surface 54b and to the same resolution, the second set of landing energies may generally be larger than the first set of landing energies (i.e. the number of landing energies in the second set may generally be greater than the number of landing energies in the first set).

Accordingly, depicted in FIG. 5 are (i) five probed regions 56a1, 56a2, 56a3, 56a4, and 56a5 centered below a lateral location 58a' (from first lateral locations 58a), and (ii) seven probed regions 56b1, 56b2, 56b3, 56b4, 56b5, 56b5, and 56b7 centered below a lateral location 58b' (from second lateral locations 58b) on a projecting structure 55' (from projecting structure 55). Probed regions below the rest of first lateral locations 58a and second lateral locations 58b are not shown. Probed region 56b1 is confined within projecting structure 55', while probed region 56b2 penetrates into first layer 52a but the center thereof is located in projecting structure 55'. Each of the centers of probed regions 56b3, 56b4, 56b5, 56b6, and 56b7 is located within a respective one of layers 52a, 52b, and 52c.

It is to be understood that the applicability of methods 100 and 300 is not limited to samples including nominally flat layers. Regions differing from one another in material composition (whether in terms of bulk material and/or profiled material) may in principle be arbitrarily shaped. In particular, methods 100 may be applied to samples characterized by a continuously varying density of the profiled material and/or the bulk material(s) as function of the depth coordinate and/or, in the three-dimensional case, as a function of the lateral coordinates. Further, the skilled person will readily perceive that method 100 and method 300 may be applied to samples including empty cavities and/or holes.

Z-Profiling Systems

According to an aspect of some embodiments, there is provided a computerized system for z-profiling of samples (such as patterned wafers and/or semiconductor structures e.g. included in patterned wafers). FIG. 6 presents schematically depicts such a system, a computerized system 600, according to some embodiments. As will be apparent from the description of system 600, system 600 may be used to implement methods 100 and 300. System 600 includes an e-beam source 602, a light sensing module 604, a computational module 606, and a controller 608. According to some embodiments, system 600 may further include a stage 620 (e.g. a xyz stage) configured to accommodate an inspected sample 60 (e.g. a patterned wafer). It is noted that sample 60 does not form part of system 600.

Dotted lines between elements indicate functional or communicational association there between.

An e-beam 605, generated by e-beam source 602, is shown incident on sample 60. As a result of the impinging of e-beam 605 on sample 60, and the penetration of e-beam 605 into sample 60, light rays (e.g. characteristic X-rays) are generated. A portion of these light rays, constituted by light rays 615, arrives at light sensing module 604.

According to some embodiments, light sensing module 604 may be configured to sense light in the X-ray frequency range. According to some such embodiments, light sensing module 604 may be sensitive only to light in the X-ray frequency range. According to some embodiments, light sensing module 604 may include a light sensor configured to measure the numbers of photons incident thereon in each of one or more frequency ranges in the X-ray frequency range. According to some embodiments, light sensing module 604 may be configured to measure the number of photons at a specific frequency (e.g. corresponding to the peak emission frequency of the profiled material), which are incident thereon. According to some embodiments, light sensing module 604 may be configured to measure the number of photons having a first frequency (e.g. corresponding to the peak emission frequency) and the number of photons having a second frequency (e.g. and the second most intense emission frequency of the profiled material), which are incident thereon. According to some embodiments, light sensing module 604 may be or include an optical spectrometer, such as an energy dispersive X-ray spectrometer or a wavelength dispersive X-ray spectrometer. According to some embodiments, light sensing module 604 may be or include an image sensor. According to some such embodiments, each pixel on the image sensor may be configured to measure the spectrum of the light incident thereon.

Light sensing module 604 is configured to relay (optionally, via controller 608) the data collected thereby (e.g. the spectrum (including intensities) of light incident thereon) to computational module 606.

According to some embodiments, system 600 may include additional elements. The additional elements may include electron optics (not shown; e.g. an electrostatic lens(es) and a magnetic deflector(s)), which may be used to guide and manipulate an e-beam generated by e-beam source 602. Additionally, or alternatively, the additional elements may include collection optics configured to guide onto light sensing module 604 light (e.g. X-ray light) generated due to the impinging of an e-beam on sample 60 and penetration thereinto. According to some embodiments, the collection optics may include an optical filter 624 configured to block light outside the X-ray frequency range—or a subrange(s) of the X-ray frequency range including some or all of the expected (e.g. based on design data) characteristic X-rays—from arriving at light sensing module 604.

At least e-beam source 602 and stage 620 may be housed within a vacuum chamber 630. While in FIG. 6 light sensing module 604 is shown positioned inside vacuum chamber 630, according to some alternative embodiments, light sensing module 604 may be positioned outside vacuum chamber 630.

Controller 608 may be functionally associated with e-beam source 602 and, optionally, stage 620. More specifically, controller 608 is configured to control and synchronize operations and functions of the above-listed modules and components during probing of an inspected sample. For example, according to some embodiments, wherein stage 620 is movable, stage 620 may be configured to mechanically translate an inspected sample (e.g. sample 60), placed thereon, along a trajectory set by controller 608.

Computational module 606 may include computer hardware (one or more processors, and RAM, as well as non-volatile memory components; not shown). The computer hardware is configured to process data (e.g. optical emission data sets)—obtained through measurement by light sensing module 604—so as to generate a concentration map of a profiled material in a sample (e.g. sample 60), essentially as described above in the Z-Profiling Methods Subsection. According to some embodiments, at each map coordinate(s) (i.e. the vertical coordinate in the one-dimensional case, and the vertical coordinate and the two lateral coordinates in the three-dimensional case), the concentration map specifies the density of the profiled material to within a respective density range (from a plurality of density ranges). That is, in such embodiments, computational module 606 may be configured to assign the density of the profiled material in a subregion about the map coordinate(s) (i.e. a thin lateral layer vertically centered about the vertical coordinate in the one-dimensional case, and a subregion (i.e. voxel) centered about the map coordinates in the three-dimensional case) to a respective density range from a plurality of (complementary) density ranges.

Alternatively, according to some embodiments, at each map coordinate(s), the concentration map specifies the density in terms of a respective (single) numerical value (i.e. at each map coordinate(s) the density of the profiled material is assigned a numerical value from a "continuum" of densities).

According to some embodiments, the computer hardware may be configured to execute an ML derived algorithm(s), which is configured to receive as inputs optical emission data sets of a sample (obtained by system 600) and to output a concentration map of a profiled material in the sample, as described above in the Z-Profiling Methods subsection. The ML derived algorithm may depend on design data of the sample, including the intended concentration of the profiled material, or may be configured to receive as additional inputs design data of the sample. According to some embodiments, each of the optical emission data sets may be labelled by the corresponding landing energy, and, when, the concentration map is three-dimensional, the coordinates of the lateral location at which the e-beam impinged on the sample. According to some embodiments, the ML derived algorithm may be a NN, such as a DNN (for example, a CNN or a fully connected NN).

According to some embodiments, the ML derived algorithm may include a VAE and a classifier (e.g. a DNN or a SVM). The VAE may be configured to extract latent variables from the obtained optical emission data sets. The classifier may be configured to receive as inputs the latent variables and to output the concentration map.

According to some embodiments, the NN may be a GAN.

According to some embodiments, wherein the concentration map specifies the concentration to within a density range, the NN may be a classification NN. According to some such embodiments, the NN may be a VGG NN or a ResNet.

According to some embodiments, to generate the concentration map of a sample, computational module 606 may be configured to further take into account—in addition to the intensities of one or more characteristic X-ray lines pertaining to the profiled material—parameters characterizing the "background" X-ray radiation (induced by the penetration of the e-beams into the sample).

According to some embodiments, e-beam source 602 may be laterally and/or vertically translatable. According to some embodiments, e-beam source 602 may be configured to allow projecting the e-beam at any one of a plurality of incidence angles relative to sample 60. In particular, according to some such embodiments, e-beam source 602 may be configured to allow projecting the e-beam not just perpendicularly to a top surface 64 of sample 60 (i.e. at an incidence angle of 0°) but also obliquely relative thereto. In such embodiments, the ML delivered algorithm (executable by computational module 606) may be configured to take into account the incidence angles of each of the e-beams in order to output the concentration map.

According to some embodiments, light sensing module 604 may be laterally and/or vertically translatable, thereby allowing to control the return angle (i.e. sense X-rays returned from sample 60 at a desired return angle or a desired continuous range of return angles). According to some embodiments, X-rays induced by e-beams of different landing energies may be sensed at different return angles, respectively. In such embodiments, the ML derived algorithm (executable by computational module 606) may be configured to take into account the return angles of each of the X-rays in computing the concentration map.

Figure 6:
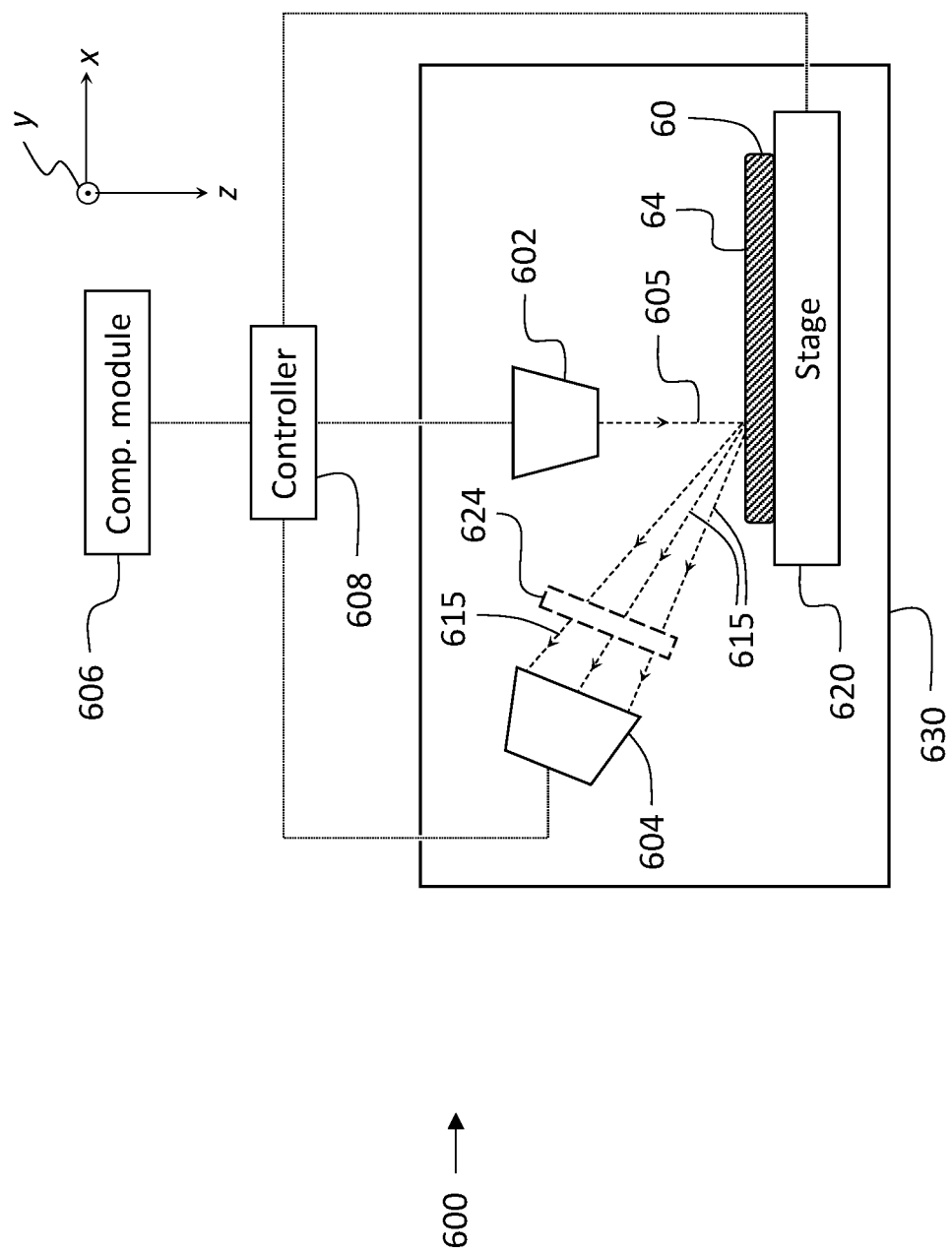
FIG. 6 presents a system for z-profiling of samples based on measurements of X-rays, according to some embodiments.
Figure 7:
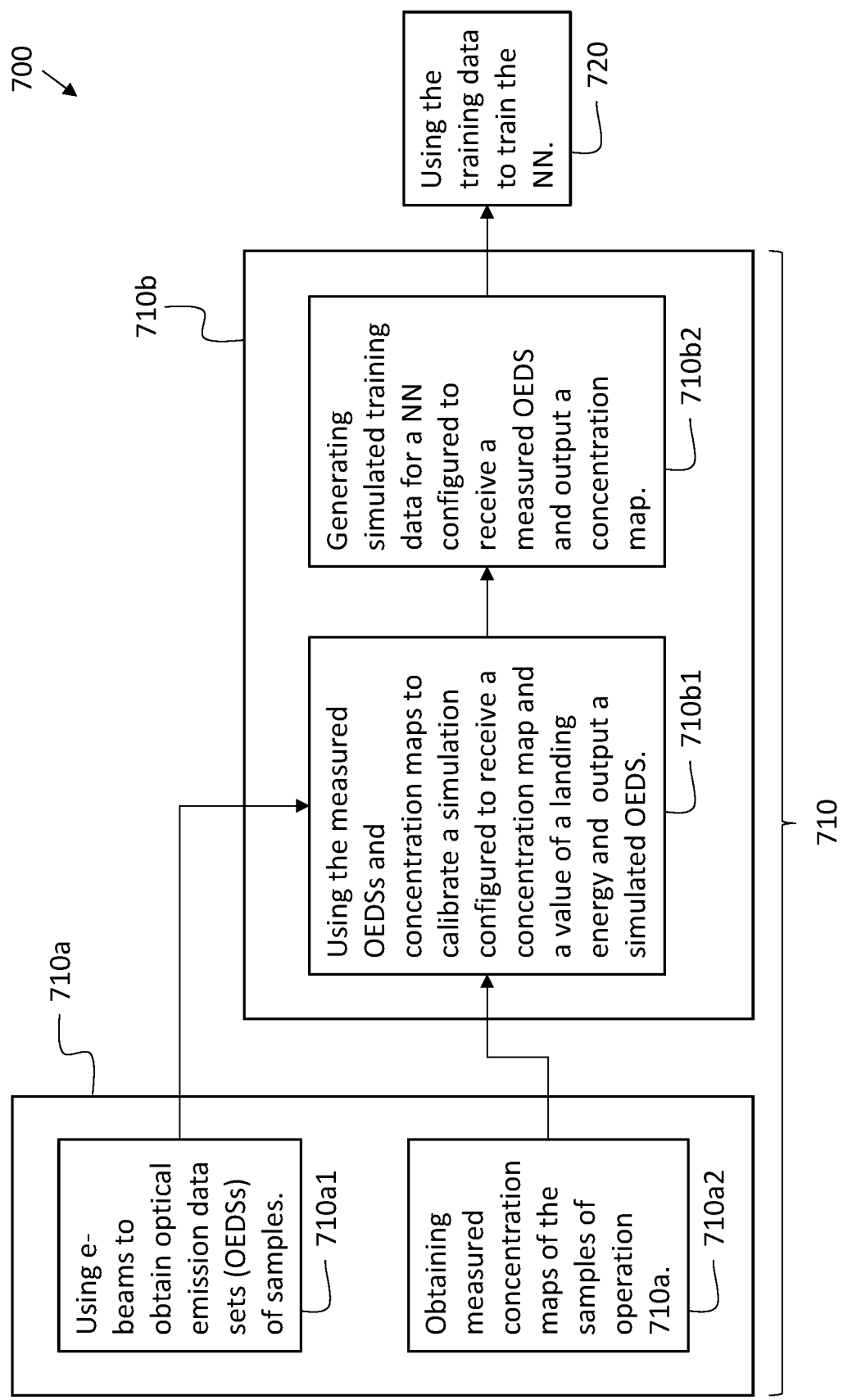
FIG. 7 presents a method for training a neural network to generate concentration maps in accordance with the method of FIG. 1, according to some embodiments thereof.

According to some embodiments, light sensing module 604 includes a plurality of light sensors (only a single light sensor is shown in FIG. 6), being thereby configured to sense X-rays returned at each of plurality of return angles, respectively.

The skilled person will readily perceive that the system 600 may be used to validate the (nominal) concentrations one or more materials in sample, as described above in the description of system 100.

Training Methods

According to an aspect of some embodiments, there is provided a method 700 for training a NN. The NN is configured to (i) receive as inputs, optical emission data sets pertaining to a sample, each obtained by projecting on the sample (e.g. one at a time) e-beams at each of a plurality of landing energies, respectively, and (ii) output a concentration map of a profiled material (i.e. the material which is to be profiled; e.g. a material introduced into the sample to tweak one or more physical properties thereof) included in the sample. Method 700 may thus be employed to train a NN to perform operation 120 of method 100 or operation 320 of method 300. Accordingly, the NN may be any one of the NNs described above in relation to methods 100 and 300. As elaborated on below, method 700 is advantageously configured to amplify a small set of "ground truth" (GT) data (i.e. actual optical emission data sets and actual concentration maps of a small plurality of samples) to obtain a large set of simulated training data for the NN. Method 700 includes:

An operation 710, wherein a training set (i.e. training data) for the NN is generated by performing:

A suboperation 710a of generating calibration data by performing for each of a plurality of $N_s$ samples:

A suboperation 710a1 of obtaining measured optical emission data sets of the sample by projecting thereon (e.g. one at a time) e-beams at each of a first plurality of landing energies and measuring light returned from the sample.

A suboperation 710a2 of obtaining a measured concentration map of a profiled material included in the sample.

A suboperation 710b, wherein simulated training data for the NN are generated by performing:

A suboperation 710b1 using the calibration data to calibrate a computer simulation, which is configured to receive as inputs a concentration map of a sample, and a value of a landing energy of an e-beam projected on the sample, and output a corresponding simulated optical emission data set.

A suboperation 710b2 of using the calibrated simulation to generate additional simulated optical emission data sets corresponding to additional landing energies and/or additional samples.

An operation 720, wherein the NN is trained using the training set. The training set includes at least the additional simulated optical emission data sets, each labelled by the respective landing energy, and the concentration maps corresponding to the simulated optical emission data sets, respectively.

The calibration data includes the measured optical emission data sets, labelled by the landing energies of the inducing e-beams, and the corresponding measured concentration maps. The simulated training data includes the additional simulated optical emission data sets, each labelled by the respective landing energies, and the corresponding concentration maps. (The training set includes at least the simulated training data).

The measured optical emission data sets together with the corresponding measured concentration maps of the profiled material (in each of the plurality of samples) constitute GT data, which is used to calibrate the simulation, as further elaborated in detail below.

According to some embodiments, the computer simulation of suboperation 710b1 is tailored to a specific intended design. In such embodiments, the computer simulation is configured to receive as inputs (i) a concentration map of a profiled material included in a sample of the specific intended design, and (ii) the landing energy of an e-beam (projected on the sample), and to output a respective optical emission data set. According to some embodiments, particularly embodiments wherein in suboperation 110b2 at least some of the additional samples may be of different intended designs, the computer simulation may be configured to additionally receive as an input the intended design of the sample.

According to some embodiments, the NN may be a DNN, such as a CNN or a fully connected NN, or may include a VAE and a classifier or a multi-head, as detailed above in the descriptions of methods 100 and 300. According to some embodiments, the NN may be a GAN.

According to some embodiments, the NN may be a classification NN (in which case, at each map coordinate(s), the concentration map specifies the density of the profiled material to within a respective density range from a plurality of density ranges).

Suboperation 710a1 may be implemented as specified in the description of measurement operations 110 and 310 of methods 100 and 300, respectively, in the Z-Profiling Methods Subsection above. In particular, the use of e-beams of different landing energies allows obtaining (measured) optical emission data sets pertaining to probed regions of the sample, which are centered about different depths, respectively.

Suboperation 710a2 may be implemented by profiling lamellas extracted from the sample and/or slices shaved off the sample. According to some embodiments, the profiling may be performed using a scanning electron microscope or a transmission electron microscope.

According to some embodiments, (i) the output of the NN is a three-dimensional concentration map, (ii) the measured concentration maps, obtained in the $N_s$ implementations of suboperation 710a2, are three-dimensional, (iii) in each implementation of suboperation 710a1, the e-beams are projected on the respective sample at each of a plurality of lateral locations thereon (i.e. on the sample), and (iv) in suboperation 710b2 the additional simulated optical emission data sets are generated for each of the plurality of lateral locations. According to some such embodiments, in operation 720 each of the additional simulated optical emission data sets, used as inputs in training the NN, is further labelled by the lateral location at which the respective e-beam impinged on the respective sample.

According to some embodiments, initially, i.e. prior to the calibration of the computer simulation in suboperation 710b1, the computer simulation specifies a set of initial point spread functions (PSFs) $\{H_{E,\lambda}^{(i)}\}_{E,\lambda}$. Each of the $H_{E,\lambda}^{(i)}$ corresponds to a respective landing energy (as indicated by the subscript E) from a set of landing energies, which includes the first plurality of landing energies, and, optionally, other landing energies. The index $\lambda$, denotes the wavelength of the sensed light (the PSF will typically vary with the wavelength of the sensed light). More specifically, for each pair of landing energy E and wavelength $\lambda$, the corresponding initial PSF specifies, as a function of the depth within the sample (and, in the three-dimensional case, the coordinates of the lateral location of incidence of the e-beam on the sample), the intensity of the light having the wavelength $\lambda$, which will be (a) generated by the profiled material, per particle or unit mass, due to the striking of the respective e-beam (i.e. having the landing energy E), and (b) detected by the light sensing module.

The set of initial PSFs may be obtained by a second computer simulation. The second computer simulation models the striking and penetration of an e-beam at each of the landing energies into a simulated sample and the light emitting interaction (or at least characteristic X-ray emitting interaction) of the e-beam with matter in the simulated sample. The simulated sample is of a same design as the intended design of the sample to be z-profiled. In suboperation 710b2 each of the initial PSFs is calibrated, thereby obtaining a set of calibrated PSFs $\{H_{E,\lambda}^{(c)}\}_{E,\lambda}$. The superscripts i (for "initial") and c (for "calibrated") serve to distinguish between the two sets.

According to some embodiments, $\{H_{E,\lambda}^{(i)}\}_{E,\lambda}=\{H_{E,\lambda}^{(i)}\}_E$ (and $\{H_{E,\lambda}^{(c)}\}_{E,\lambda}=\{H_{E,\lambda}^{(c)}\}_E$). That is, the subscript $\lambda$, is not a running index. According to some such embodiments, wherein the trained NN is employed in data analysis operation 120 of method 100, in each implementation of suboperation 110b (of measurement operation 110) the intensity of the emitted light is measured only at a specific frequency (e.g. the peak characteristic X-ray emission frequency). According to some other such embodiments, wherein the trained NN is employed in data analysis operation 120 of method 100, in each implementation of suboperation 110b the intensity of the emitted light is measured at a plurality of frequencies (e.g. employing a spectrometer), but in data analysis operation 120, the concentration map is generated based on optical emission data corresponding to a single frequency (potentially after a preprocessing operation, e.g. to reduce noise, involving optical emission data pertaining to other frequencies).

It is noted that in the one-dimensional case (i.e. when a one-dimensional concentration map of the sample is to be obtained), each of the (initial and calibrated) PSFs is a single-variable function, which depends only on the depth, and accordingly, in suboperation 710b2: $\{H_{E,\lambda}^{(i)}(z)\}_{E,\lambda} \to \{H_{E,\lambda}^{(c)}(z)\}_{E,\lambda}$, wherein the coordinate z parameterizes the depth. In the three-dimensional case (i.e. when a three-dimensional concentration map of the sample is to be obtained), each of the PSFs is a three-variable function and is further indexed by the coordinates $L=(L_x, L_y)$ of the lateral location on which the respective e-beam struck (i.e. impinged on) the sample. Accordingly, in such embodiments, in suboperation 710b2: $\{H_{E,L,\lambda}^{(i)}(r)\}_{E,L,\lambda} \to \{H_{E,L,\lambda}^{(c)}(r)\}_{E,L,\lambda}$, wherein $r=(x, y, z)$.

More specifically, as a non-limiting example in the one-dimensional case, assuming that the measured intensities (i.e. the measured numbers of photons) are Gaussian-distributed, the probability of measuring an intensity $I_{E,\lambda}$ given the actual (true) $H_{E,\lambda}(z)$ is given by: $p(I_{E,\lambda}|H_{E,\lambda}(z), \rho(z)) \propto \exp[-N(I_{E,\lambda}-\int dz' H_{E,\lambda}(z')\rho(z-z'))^2]$. Here $\rho(z)$ denotes a density (e.g. particle density) of the profiled material (measured in suboperation 710b2), and N is a normalization factor. Since in this example, the calibration is performed separately with respect to each wavelength (or, equivalently, frequency), in the following the subscript $\lambda$ is dropped.

For a sufficiently large number of photons sensed, the $H_E(z)$ are expected to maximize the likelihoods $p(I_{E,s}|H_E(z),$ $\rho_s(z)$). The added subscript s denotes the sample (from the $N_s$ samples of suboperation 710a). The $I_{E,s}$ are the intensities, measured in the $N_s$ implementations of suboperation 710a1, and the $\rho_s$ are densities of the profiled material in each of the $N_s$ samples, respectively. Discretizing $H_E(z)$, so that each $H_E(z)$ is approximated by a $N_z$ component (row) vector $H_E$, which specifies averaged values of $H_E(z)$ about each of $N_z$ depths (which may or may not be equally spaced), the $H_E^{(c)}(z)$ (or, more precisely, the discretization thereof $H_c$) may be deduced by solving the optimization problem: $H_c = \mathrm{argmin}_H(\|H\rho - I\|_F^2 + \gamma \|H - H_i\|_F^2)$. Here H is a $N_E \times N_z$ matrix, wherein $N_E$ is the number of landing energies. That is, the rows of H are constituted by the $H_E$. $\rho$ is a $N_z \times N_s$ matrix. For each $1 \le j \le N_s$, the j-th column of $\rho$ specifies averaged values of the density of the profiled material in the j-th sample about each of the $N_z$ depths. I is a $N_E \times N_s$ matrix. For each $1 \le j \le N_s$, the j-th column of I specifies the intensities (i.e. the measured number of photons) for each of the plurality of landing energies measured in the implementations of suboperation 710a1 (for the given wavelength with respect to which the corresponding PSFs are calibrated) when applied with respect to the j-th sample. The rows of are constituted by the (row) vectors $H_E^{(i)}$, which are obtained by discretizing the $H_E^{(i)}(z)$. The subscript F indicates the Frobenius norm. $\gamma$ is a hyperparameter whose value may be "manually" adjusted to optimize, or at least improve, the estimate of H (and thereby of the $H_E(z)$). Similarly, the degree of discretization (i.e. the number of $N_z$) may be selected based on the required accuracy. The optimization problem may be solved iteratively, e.g. using a modified Richardson-Lucy algorithm, wherein, as a first approximation H is taken to equal $H_i$. According to some embodiments, $N_E$ equals at least $N_z$.

It is noted that the above optimization problem is underdetermined, and so has no unique solution. There is thus no absolute guarantee that the deduced $H_E^{(c)}(z)$ will closely match the actual $H_E(z)$. Nevertheless, if the initially simulated PSFs (i.e. the $H_E^{(i)}(z)$) are close to the actual $H_E(z)$, the solution of the optimization problem will likely converge to closely matching functions.

In the three-dimensional case, each of the $H_{E,L}(r)$ (L specifies the lateral location on the sample on which the respective e-beam is incident) may be approximated by a $N_r$ component (row) vector $H_{E,L}$, which specifies averaged values of $H_{E,L}(r)$ about each of $N_r$ locations (specified by the vector r=(x, y, z)) in the sample. The rows of H are constituted by the $H_{E,L}$. $\rho$ is now a $N_r \times N_s$ matrix, so that $H\rho$ is a $(N_E \cdot N_L) \times N_{GT}$ matrix, wherein $N_L$ is the number of impinged lateral locations on the sample. I is a $(N_E \cdot N_L) \times N_s$ matrix. For each $1 \le j \le N_s$, the j-th column of I specifies the number of electrons—per each of the $N_L$ impinged locations and each of the plurality of landing energies—detected in suboperation 710a when profiling the j-th sample. According to some embodiments, $N_E \cdot N_L$ is at least equal to $N_r$. According to some embodiments, in suboperation 710b2, the additional samples are of different design or designs than the plurality of samples of suboperation 710a.

According to some embodiments, suboperation 710b and operation 720 may reapplied when relevant new calibration data becomes available. More specifically, even after the NN has been trained (and can be used to implement data analysis operation 120 of method 100), as new calibration data—particularly, pertaining to other design intent (e.g. new internal geometries, bulk materials, and/or profiled material concentrations, and, optionally, even other profiled materials)—becomes available, suboperation 710b and operation 720 may be reapplied to expand the applicability of method 100 and/or improve the accuracy thereof.

According to some embodiments, wherein, in suboperation 710b2, the additional simulated optical emission data are generated for, or also for, additional samples, in operation 720, each of the additional simulated optical emission data, used as inputs in training the NN, is further labelled by the additional sample with respect to which the additional simulated optical spectra were obtained.

According to some embodiments, operation 720 includes an initial training suboperation, which may be unsupervised, in which latent variables characterizing the measured optical emission data are extracted.

According to some alternative embodiments, $H_i$ may be calibrated employing a U-Net deep learning NN. That is, $H_c = U_F(\theta) \circ H_i$, wherein $U_F(\theta)$—the U-Net—is a CNN and the symbol $\circ$ denotes the application of $U_F(\theta)$ on $H_i$. The components of the vector $\theta$ represent are adjustable parameters of the U-Net. $U_F(\theta)$ is obtained from the GT data constraints, which can be compactly expressed as $I = (U_F(\theta) \circ H_i)\rho$. It is noted that since $U_F(\theta)$ is nonlinear—unlike the above-described maximum-likelihood based calibration approach—the correction to $H_i$ will generally be nonlinear.

The skilled person will readily perceive that method 700 may be used train a NN to perform operation 120 of method 100 in embodiments wherein method 100 is used to validate the (nominal) concentration a material in sample, as explained above in the description of method 100.

As used herein, according to some embodiments, the terms "concentration", "density", and "distribution" are interchangeable.

As used herein, the terms "measuring" and "sensing" are used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods, according to some embodiments, may be described in a specific sequence, the methods of the disclosure may include some or all of the described operations carried out in a different order. In particular, it is to be understood that the order of operations and suboperations of any of the described methods may be reordered unless the context clearly dictates otherwise, for example, when a latter operation requires as input the output of earlier operation or when a latter operation requires the product of an earlier operation. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A system for non-destructive depth-resolved profiling of patterned wafers, the system comprising:
   an electron beam (e-beam) source configured to project e-beams on a patterned wafer at a plurality of landing energies and at a plurality of lateral locations within a profiled region of the patterned wafer that includes lateral non-uniformity, the e-beams inducing X-ray-emitting interactions within respective probed volumes, whose depth varies according to the landing energy;
   an X-ray sensing module configured to detect X-rays emitted from the patterned wafer and to generate X-ray emission data sets for the probed volumes, each associated with the landing energy and the lateral location of the inducing e-beam; and
   a computational module configured to generate, based on the X-ray emission data sets, a depth-resolved concentration map that quantifies a dependence of a concentration of a profiled material within the profiled region on depth and one or more lateral coordinates,
   wherein the computational module is configured to execute an algorithm that employs or is at least partially derived from simulated X-ray emission data generated by computer simulation of X-ray emissions predicted for e-beams of varying landing energies incident at a plurality of locations according to intended-design data for the profiled region.

2. The system of claim 1, wherein the X-ray sensing module is configured to measure an intensity of at least a portion of the respectively emitted X-rays, which have a frequency equal to, or within a frequency range about, a peak characteristic X-ray emission frequency of the profiled material.

3. The system of claim 2, wherein the X-ray sensing module comprises an energy-dispersive X-ray spectrometer or a wavelength-dispersive X-ray spectrometer.

4. The system of claim 1, wherein the computational module is configured to execute a machine-learning derived algorithm trained at least in part using the simulated X-ray emission data, whose output is the concentration map and whose inputs comprise the X-ray emission data sets, each labeled by the respective landing energy.

5. The system of claim 4, wherein the machine-learning derived algorithm is a classification neural network and the concentration map specifies the density of the profiled material to each of a plurality of density ranges.

6. The system of claim 1, wherein the concentration map is three-dimensional and quantifies the dependence of the concentration of the profiled material on depth and two lateral coordinates.

7. The system of claim 1, wherein a lateral resolution of the concentration map corresponds to a spacing between adjacent lateral locations.

8. The system of claim 1, wherein the spacing between adjacent lateral locations is smaller than a lateral width of segments of differing composition in the profiled region of the patterned wafer.

9. The system of claim 1, wherein values of the concentration map quantify a concentration of the profiled material within a corresponding voxel localized at the corresponding depth and lateral coordinates in the profiled region, and wherein the X-ray emission data sets for some or all of the landing energies correspond to X-ray-emitting interactions occurring within a probed volume of lateral dimensions that overlap a plurality of the voxels.

10. The system of claim 1, wherein the profiled region exhibits non-flat topology comprising areas at different elevations and/or includes at least one cavity or hole.

11. The system of claim 1, wherein sets of landing energies employed at different lateral locations are selected to differ from one another to achieve comparable depth coverage across materials of differing elevation and/or composition.

12. The system of claim 1, wherein the profiled material is an element combined with a semiconductor whose concentration modifies an electrical property of the combination.

13. The system of claim 1, wherein the concentration map is generated for two or more profiled materials.

14. The system of claim 1, wherein the simulated X-ray emission data is generated by a computer simulation calibrated using measured X-ray emission data sets and corresponding measured concentration maps for one or more reference samples.

15. The system of claim 1, wherein the computational module is further configured to use intended-design data of the profiled region as an input when generating the concentration map.

16. The system of claim 1, wherein the system is configured to resolve variations in concentration of the profiled material to within 1-5% of a nominal concentration of the profiled material.

17. A computer-implemented method for non-destructive depth-resolved profiling of patterned wafers, the method comprising:
   for each of a plurality of landing energies and for each of a plurality of lateral locations within a profiled region of the patterned wafer that includes lateral non-uniformity:
      projecting an electron beam (e-beam) to induce X-ray-emitting interactions within a respective probed volume whose depth varies according to the landing energy; and
      detecting emitted X-rays to obtain an X-ray emission data set labeled by the landing energy and the lateral location; and
   generating, based at least on the X-ray emission data sets, a depth-resolved concentration map that quantifies a dependence of a concentration of a profiled material within the profiled region on depth and one or more lateral coordinates,
   wherein generating the concentration map comprises executing an algorithm that employs or is at least partially derived from simulated X-ray emission data generated by computer simulation of X-ray emissions predicted for e-beams of varying landing energies incident at a plurality of locations according to intended-design data for the profiled region.

18. The method of claim 17, wherein intended-design data of the profiled region is used as an input in generating the depth-resolved concentration map.

19. The method of claim 17, wherein detecting X-rays emitted from the profiled region comprises measuring an intensity of a portion of the respectively emitted X-rays which have a frequency equal to, or within a frequency range about, a peak characteristic X-ray emission frequency of the profiled material.

20. The method of claim 17, wherein the concentration map is an output of a machine learning derived algorithm trained at least in part using the simulated X-ray emission data, whose inputs comprise the X-ray emission data sets, each labeled by the landing energy of the respective inducing e-beam.

\* \* \* \* \*